US012682299B2

(12) United States Patent
Cooks et al.

(10) Patent No.: US 12,682,299 B2
(45) Date of Patent: Jul. 14, 2026

(54) WORK MANAGEMENT PLATFORM

(71) Applicant: Shipt, Inc., Birmingham, AL (US)

(72) Inventors: Bryce Cooks, Chicago, IL (US); Eric Cotner, San diego, CA (US); Cooper Filby, Birmingham, AL (US); Nathan Hartwell, Birmingham, AL (US); Jair Medina, Seattle, WA (US); Jean-Michel Michno, Minneapolis, MN (US); Kuang Xu, Palo Alto, CA (US)

(73) Assignee: Shipt, Inc., Birmingham, AL (US)

( * ) Notice: Subject to any disclaimer, the term of this patent is extended or adjusted under 35 U.S.C. 154(b) by 470 days.

(21) Appl. No.: 18/149,606

(22) Filed: Jan. 3, 2023

(65) Prior Publication Data

US 2024/0220894 A1 Jul. 4, 2024

(51) Int. Cl.
G06Q 10/0631 (2023.01)

(52) U.S. Cl.
CPC ................ G06Q 10/06316 (2013.01); G06Q 10/063118 (2013.01)

(58) Field of Classification Search
CPC ................ G06Q 10/063118; G06Q 10/06316
See application file for complete search history.

(56) References Cited

U.S. PATENT DOCUMENTS

| | | | |
|---|---|---|---|
| 8,271,398 B2 | 9/2012 | Spiegel et al. | |
| 9,488,484 B2 | 11/2016 | Lord et al. | |
| 9,557,183 B1 | 1/2017 | Ross et al. | |

| | | | |
|---|---|---|---|
| 10,127,517 B2 | 11/2018 | Carr et al. | |
| 10,423,921 B2 | 9/2019 | Wilkinson et al. | |
| 10,762,447 B2 | 9/2020 | Kislovskiy et al. | |
| 11,080,806 B2 | 8/2021 | Kislovskiy et al. | |
| 11,501,247 B1 | 11/2022 | Sahasrabudhe et al. | |
| 2011/0264609 A1 | 10/2011 | Liu et al. | |
| 2015/0095120 A1 | 4/2015 | Gibson et al. | |
| 2015/0317582 A1* | 11/2015 | Nath ................ | G06Q 10/06311 705/7.13 |
| 2015/0356501 A1 | 12/2015 | Gorjestani et al. | |
| 2016/0275439 A1 | 9/2016 | Avats | |
| 2016/0300178 A1 | 10/2016 | Perry et al. | |
| 2016/0364679 A1 | 12/2016 | Cao | |

(Continued)

FOREIGN PATENT DOCUMENTS

EP 3258430 A1 12/2017

OTHER PUBLICATIONS

"I See Tacos in Your Future": Order Volume Forecasting at Grubhub; Gayan Seneviratna; Jun. 24, 2021 (Year: 2021).*

(Continued)

*Primary Examiner* — Deirdre D Hatcher
(74) *Attorney, Agent, or Firm* — Merchant & Gould P.C.

(57) ABSTRACT

A platform for managing work is disclosed. In example embodiments, the platform may match orders and workers. In some embodiments, the platform may use one or more models that have inputs related to order characteristics or past worker behavior. In some embodiments, the platform may receive future orders and actualize future orders. To actualize future orders, the platform may use one or more models that have inputs related to order characteristics or past worker behavior. In some examples, orders may be shopping orders or deliveries. In some examples, workers may be shoppers or drivers.

17 Claims, 18 Drawing Sheets

1200

(56) References Cited

U.S. PATENT DOCUMENTS

| | | | |
|---|---|---|---|
| 2017/0061357 A1* | 3/2017 | Dubey | G06Q 10/063112 |
| 2017/0262770 A1 | 9/2017 | Purdy et al. | |
| 2018/0315319 A1* | 11/2018 | Spector | G08G 1/0104 |
| 2019/0385125 A1 | 12/2019 | Blakely et al. | |
| 2020/0151652 A1 | 5/2020 | Lavallee et al. | |
| 2020/0210899 A1 | 7/2020 | Guo | |
| 2020/0219171 A1 | 7/2020 | Zhuang et al. | |
| 2020/0294172 A1* | 9/2020 | Ebener, Jr. | G06Q 10/06312 |
| 2020/0342402 A1 | 10/2020 | Rajkhowa et al. | |
| 2020/0402013 A1* | 12/2020 | Yeung | G06Q 10/1053 |
| 2022/0083954 A1* | 3/2022 | Starostenko | G06Q 10/087 |
| 2022/0092519 A1 | 3/2022 | Hunter et al. | |
| 2022/0207931 A1* | 6/2022 | Hinduja | G06N 20/20 |
| 2022/0245586 A1* | 8/2022 | Moghadam | G06N 5/02 |
| 2023/0316172 A1 | 10/2023 | Ayat et al. | |
| 2023/0410002 A1* | 12/2023 | Yoo | G06N 20/00 |
| 2024/0220893 A1 | 7/2024 | Cooks et al. | |

OTHER PUBLICATIONS

Jia et al., An Optimization Framework for Online Ride-Sharing Markets; Dated Dec. 12, 2016; 10 Pages.

Kwan et al., Driver Scheduling Using Genetic Algorithms with Embedded Combinatorial Traits; Dated 1999; 2 Pages.

Santini et al., The Probabilistic Travelling Salesman Problem with Crowdsourcing; Dated Jun. 2022; 48 Pages.

Setzke et al., Matching Drivers and Transportation Requests in Crowdsourced Delivery Systems; Dated 2017; 10 Pages.

Uber Marketplace Matching; Last Accessed Aug. 2, 2022; 7 Pages.

Zhang et al., Online crowdsourced truck delivery using historical information; Dated Sep. 1, 2022; 10 Pages.

Zhou, Ivan, Uber Driver Schedule Optimization; Dated Jan. 20, 2018; 20 Pages

He et al., Model for Crowdsourced Parcel Delivery Embedded into Mobility as a Service Based on Autonomous Electric Vehicles; Dated May 21, 2021; 24 Pages.

Amazon Flex: Frequently Asked Questions; Dated 2022; 6 Pages.

Matsuoka, Yoki, Tatsushi Nishi, and Kevin Tierney. "Machine learning approach for identification of objective function in production scheduling problems." 2019 IEEE 15th international conference on automation science and engineering (CASE). IEEE, 2019. (Year : 2019).

* cited by examiner

200

204a

204b

204c

204x

Network 216a

Work Management Platform 202

Network 216b

User 206

External Database 214

Worker Registration System 212

Location System 210

Order Creation System 208

700

900

Receive Communication
from Worker 902

Offer Selected? 904

NO

Offer Order to Other
Worker 908

Update Order-Worker
Selection Model and
Order-Worker Data 906

YES

Assign Order to Worker 910

Receive Second
Communication from
Worker 912

Order Dropped? 914

YES

NO

Update Order-Worker
Completion Model and
Order-Worker Data 918

Order Completed? 916

NO

YES

End 920

| Order ID | Worker ID | Offer ID | Last Update | Last Update Time |
|----------|-----------|----------|-------------|------------------|
| A | 001 | 1 | Order Completed | 10:15 |
| B | 002 | 3 | Order Begun | 11:00 |
| C | 004 | 4 | Order Changed | 10:45 |
| C | 007 | 5 | Order Distressed | 11:20 |
| D | 002 | 6 | Order Selected | 11:20 |
| E | 008 | 9 | Offer Made | 11:30 |
| F | x | x | Order Eligible | 11:15 |
| G | x | x | Order Dropped | 10:50 |
| K | x | x | Eligibility Changed | 11:30 |
| E | 005 | 2 | Offer Expired | 11:55 |
| J | 004 | 10 | Offer Declined | 11:55 |
| x | 003 | x | Worker Online | 12:00 |

1000

1100

Offer Future Orders <u>1102</u>

Receive Claimed Future Orders <u>1104</u>

1106 →

Receive Orders <u>1108</u>

Actualize Future Orders <u>1110</u>

1200

Actualize Future Orders 1110

Determine Predicted Number of Completed Orders 1202

Determine Order-Worker Completion Likelihoods 1204

Match Orders to Workers 1206

Match Orders to Workers Using Order-Worker Completion Likelihoods 1208

Match Orders to Workers Using Worker Preferences 1210

Assign Orders to Workers 1212

1300

1500

```
┌─────────────────────┐
│ Transmit Order      │
│ Details to          │
│ Worker 1502         │
└─────────────────────┘
           │
           ▼
┌─────────────────────┐
│ Receive             │
│ Communication       │
│ from Worker 1504    │
└─────────────────────┘
           │
           ▼
```

Order Dropped? 1506 — YES → Offer Order to Other Worker 1508

NO

Order Completed? 1510 — NO → (to Offer Order to Other Worker 1508)

Update Models and Order-Worker Data 1512

YES

End 1514

1800

WORK MANAGEMENT PLATFORM

BACKGROUND

An organization that manages work faces various challenges. For example, the organization may have to determine how to match jobs with workers. In the shipping industry, for example, an organization may have orders to deliver and drivers to deliver them. Oftentimes, determining what order to assign to which driver is difficult. For example, there may be scheduling conflicts, faulty communication, or some orders and drivers may not be a good fit. Other challenges may include tight deadlines, changing circumstances, or a nontraditional workforce.

In the gig economy, for example, workers may select when and where they work, and what type of work to take on, giving them a flexibility that may make managing work more difficult. For example, an organization may not be able to dictate when gig workers work, where they work, or how frequently they work. Furthermore, gig workers may stop working for an organization if the worker experience is deficient or if other gig work is more enticing. Thus, managing work may be particularly challenging for an organization that operates in the gig economy.

Additionally, an organization may have its own goals and constraints to consider when managing work. For instance, an organization may seek to minimize costs while also seeking to maximize the quality of work, or the percentage of work completed. Furthermore, an organization may have various constraints, such as infrastructure, cost, or time constraints. Although some traditional approaches to managing work may be straightforward, they may lead to suboptimal outcomes. For example, in the context of matching workers and work, techniques that primarily rely on heuristics may mismatch certain jobs and workers. Additionally, other work-management techniques that do not adequately consider relevant and available information may result in inefficient workflows, increased costs, or impaired customer and worker experiences.

SUMMARY

Aspects of the present disclosure relate to a platform for managing work. The platform, in some examples, may use one or more models to match orders and workers, and then offer orders to matched workers. Additionally, the platform, in some examples, may offer future orders to workers and then later update those orders using actual order data.

In an example aspect, a work management platform comprises a processor and a memory coupled to the processor, the memory storing instructions that, when executed by the processor, cause the work management platform to: determine a plurality of order-worker scores for a plurality of orders and a plurality of workers; based at least in part on the plurality of order-worker scores and an optimization process applied across the plurality of order-worker scores, match each order of the plurality of orders to a matched worker of the plurality of workers; and for each order of the plurality of orders, offer the order to the matched worker; wherein determining the plurality of order-worker scores comprises, for each of the plurality of orders, determining, for each of the plurality of workers, a score using one or more models, the one or more models being trained using a plurality of model features, wherein at least some of the model features relate to at least one of order characteristics of the order or past behavior of the worker.

In a second aspect, a method for managing work is disclosed. The method comprises determining a plurality of order-worker scores for a plurality of orders and a plurality of workers; based at least in part on the plurality of order-worker scores and an optimization process applied across the plurality of order-worker scores, matching each order of the plurality of orders to a matched worker of the plurality of workers; and for each order of the plurality of orders, offering the order to the matched worker; wherein determining the plurality of order-worker scores comprises, for each of the plurality of orders, determining, for each of the plurality of workers, a score using one or more models, the one or more models being trained using a plurality of model features, wherein at least some of the model features relate to at least one of order characteristics of the order or past behavior of the worker.

In a third aspect, a non-transitory computer-readable medium is disclosed. The non-transitory computer-readable medium has stored instructions thereon, which when executed by a processor, cause the processor to manage work by performing a method comprising: determining a plurality of order-worker scores for a plurality of orders and a plurality of workers; based at least in part on the plurality of order-worker scores, matching each order of the plurality of orders to a matched worker of the plurality of workers; and for each order of the plurality of orders, offering the order to the matched worker; wherein determining the plurality of order-worker scores comprises, for each of the plurality of orders, determining, for each of the plurality of workers, a score using one or more models, wherein at least some model inputs of the one or more models relate to order characteristics of the order or past behavior of the worker; wherein the one or more models include a first model for determining an order-worker selection likelihood and a second model for determining an order-worker completion likelihood; wherein the order-worker selection likelihood corresponds to a likelihood that the worker selects the order if offered; wherein the order-worker completion likelihood corresponds to a likelihood that the worker completes the order if assigned; and wherein determining, for each of the plurality of workers, the score using the one or more models comprises: using the first model to determine the order-worker selection likelihood; using the second model to determine the order-worker completion likelihood; and calculating the score at least in part by combining the order-worker selection likelihood and the order-worker completion likelihood; wherein each order of the plurality of orders is a shopping order or a delivery; and wherein each worker of the plurality of workers is a shopper or a driver.

In a fourth aspect, a work management platform comprises: a processor; and a memory storing instructions, wherein the instructions, when executed by the processor, cause the work management platform to: receive a plurality of future orders associated with a plurality of workers, wherein each future order of the plurality of future orders is claimed by a worker of the plurality of workers; receive a plurality of orders; and actualize the plurality of future orders; wherein actualizing the plurality of future orders comprises, for each of the plurality of orders: matching the order to a matched worker of the plurality of workers, wherein matching the order to the matched worker comprises using one or more models, wherein at least some model inputs of the one or more models relate to order characteristics of the order or past behavior of the matched worker; and assigning the order to the matched worker.

In a fifth aspect, a work management method is disclosed. The method comprises: receiving a plurality of future orders associated with a plurality of workers, wherein each future order of the plurality of future orders is claimed by a worker of the plurality of workers; receiving a plurality of orders; and actualizing the plurality of future orders; wherein actualizing the plurality of future orders comprises, for each of the plurality of orders: matching the order to a matched worker of the plurality of workers, wherein matching the order to the matched worker comprises using one or more models, wherein at least some model inputs of the one or more models relate to order characteristics of the order or past behavior of the matched worker; and assigning the order to the matched worker.

In a sixth aspect, a non-transitory computer-readable medium has stored instructions thereon. The instructions, when executed by the processor, cause the processor to manage work by performing a method. The method comprises: receiving a plurality of future deliveries associated with a plurality of drivers; receiving a plurality of deliveries; and actualizing the plurality of future deliveries; wherein actualizing the plurality of future deliveries comprises, for each of the plurality of deliveries: matching the delivery to a matched driver of the plurality of drivers, wherein matching the delivery to the matched driver comprises using one or more models, wherein at least some model inputs of the one or more models relate to order characteristics of the delivery or past behavior of the matched driver; and assigning the delivery to the matched driver; wherein each of the deliveries comprising an origin location and one or more destinations; wherein the origin location is a sortation center, a warehouse, or a store; and wherein the one or more destinations include one or more residences.

DETAILED DESCRIPTION

Figure 1:
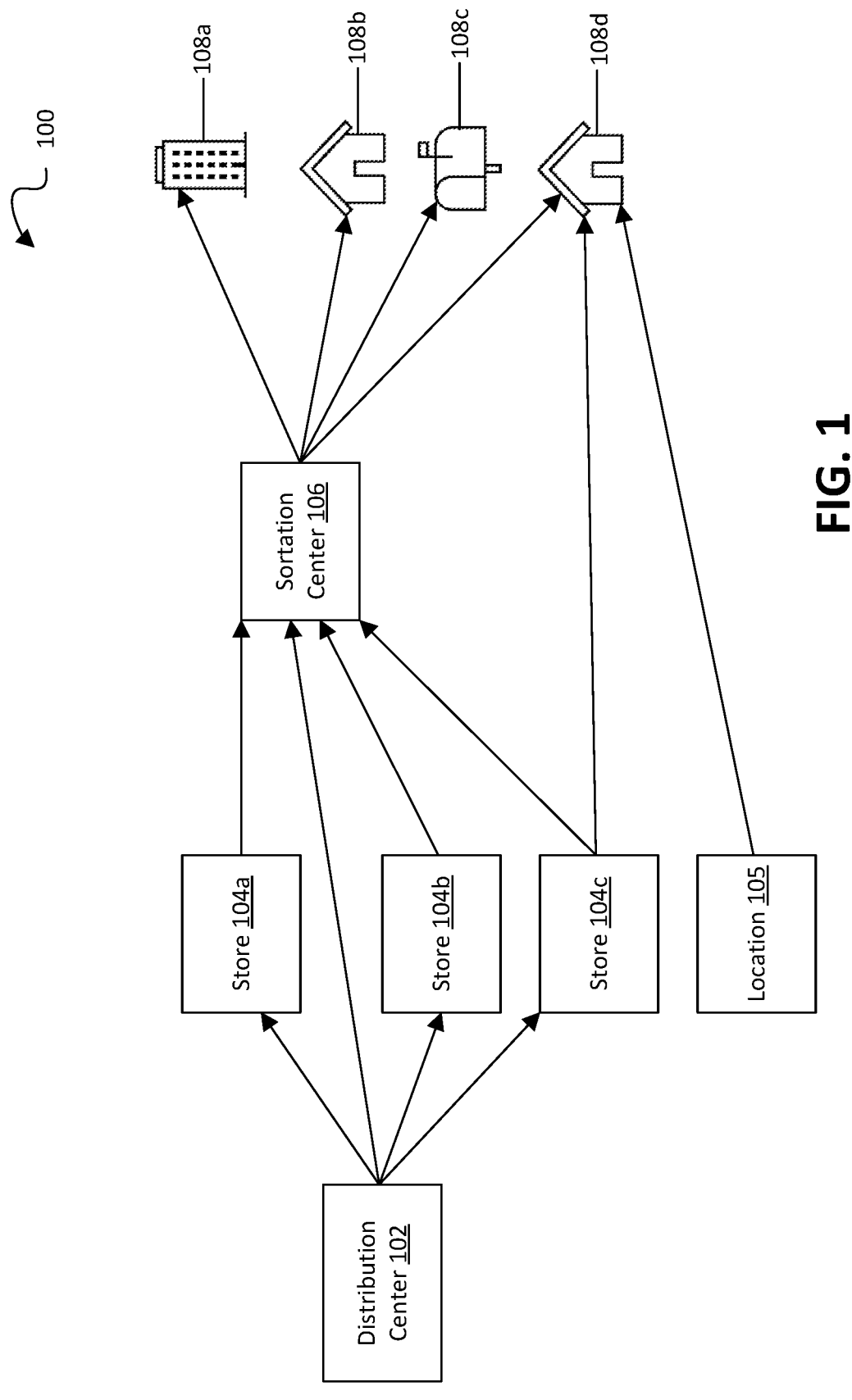
FIG. 1 illustrates a block diagram of portions of an example supply chain.

As briefly described above, aspects of the present disclosure relate to a work management platform. In some examples, the platform can determine what workers to match with which orders and when. In one example, the platform can use models trained on past worker behavior and order data to select which orders to offer to which workers. In another example, the platform can, given projected orders that were claimed ahead of time, actualize those orders by assigning updated orders to the workers.

In one example embodiment, the work management platform can have a plurality of jobs that need to be completed. In some examples, the jobs can be orders, which may be shopping or delivery orders, such as single-stop or multi-stop delivery routes. Depending on the embodiment, the workers may be shoppers, drivers, may perform a combination of shopping and driving work, or may be other types of workers entirely. For each order, there may be only a subset of the workers who can work the order, such as workers who are both available and eligible to work that order, with eligibility being determined, in some examples, at least in part by a worker's geolocation or selected work zone.

In example aspects, the work management platform can match each of the plurality of orders to one or more of the workers, and then offer each order to the one or more matched workers. To do so, the platform may calculate an order-worker score for each combination of orders and workers, resulting in a matrix of order-worker scores. The order-worker scores may include a combination of multiple scores, including an order-worker selection likelihood and an order-worker completion likelihood. Furthermore, the platform may weigh order-worker scores using an order value and alter order-worker scores using indicators related to worker performance, such as worker engagement or timeliness.

In example aspects, the order-worker selection likelihood may represent a probability that the worker will select the order if offered. The order-worker completion likelihood may represent a probability that the worker will complete the order if assigned. Each of these likelihoods may be determined using data-driven models. These models may use machine learning techniques using features that include characteristics of orders and past behavior of workers.

In example aspects, the work management platform may use order-worker scores to match each order to one or more workers. To do so, the platform may optimize a metric while accounting for one or more constraints. Furthermore, the platform may communicate with workers via a mobile application. The platform may send order details to workers and then receive communications from them, such as indications that an order has been selected by a worker, or that an order has been completed or dropped. The platform may respond in various ways to worker communications, such as by tracking a current state of orders or workers, updating worker or order data, reoffering an order, or updating one or more of the models.

In another example embodiment, the work management platform may forecast future work and then actualize that work later. For example, the work management platform may have a plurality of future orders that were accepted by a plurality of workers. In some examples, the orders may be deliveries or routes, and the workers may be drivers. In some examples, the future orders may be orders that were projected, offered, and accepted before they were ready to be performed. Later, the work management platform may receive a plurality of actual orders, which may correspond to the future orders but may be different than the future orders because of incompleteness when projecting the future orders.

In example aspects, the work management platform can actualize the future orders. For example, the work management platform may match actual orders with workers who claimed the future orders. To do so, the platform may use models and preference data of the workers. For example, the platform may use a model for determining how many orders a worker is likely to complete and a model for determining how likely a worker is to complete an order if assigned to that order. These models may include features related to past worker behavior, characteristics of an order, characteristics of future orders claimed by a worker, or external conditions, such as the date, time, or weather conditions.

In example aspects, the work management platform may assign each of the orders to the order's matched worker. The platform can transmit details of the actual order to the matched worker. Furthermore, in some embodiments, the platform may receive data related to an assigned order, such as data indicating that an order has been completed or dropped. In response, the platform may reassign the order if necessary. The platform may also update one or more of the models or update order or worker data.

Certain embodiments of the present disclosure have technical features that make them particularly advantageous over existing tools. Specifically, in some embodiments, the models of the present disclosure accurately predict which workers will select and complete which orders. Thus, the platform may more precisely tailor which workers to offer orders to, thereby reducing the number of offers made, an improvement that saves computational resources by reducing the number of offers to track and by reducing push notifications and other data sent to workers that might be associated with offers likely to be unproductive or unselected. This also reduces the confusion caused to those workers, by potentially mixing productive or enticing offers with those which are not likely to be selected. Furthermore, tailoring offers to workers likely to accept and complete them also mitigates the harmful result to overall workflow that occurs when workers take orders that they are unlikely to fulfill, a behavior that may take orders from other workers and lead to overhead costs and suboptimal outcomes.

Additionally, because the models of the present disclosure may train on large quantities of real past data, and because they continue to learn based on new events, they are not only good predictors of future events, but they continuously adapt as workers, orders, and other circumstances changes. Furthermore, by matching orders and workers using these models, less orders are dropped, and more orders are fulfilled, improvements that save computational resources spent in reallocating and tracking work, and that improve workflow efficiency, worker experience, and customer satisfaction. Moreover, aspects of the present disclosure result in less work being dropped when it is almost due, an improvement that not only improves order completion timeliness, but also reduces costs, because an organization is less frequently required to offer incentives (e.g., extra pay) or outsource the work to get it done.

Furthermore, using aspects of the present disclosure, such as offering and then actualizing future orders, an organization can delay assigning orders, thereby allowing the organization to consider more data when allocating work, an improvement that allows the organization to efficiently aggregate the work into assignable pieces. And despite this delay, the organization, by using future orders, may still assure that there are sufficient workers to fulfill the orders. Furthermore, having received more details about the orders, the organization can intelligently assign the orders to workers who signed up to work. For example, by determining how many and which orders a worker is likely to complete, the organization can improve the likelihood that assigned work is completed, thereby saving time and computation resources by avoiding reassignment, lowering costs by avoiding extra pay, improving worker satisfaction by providing orders that match the workers, and increasing the number of timely deliveries. Additionally, aspects of the present disclosure include features that further increase worker satisfaction, such as incorporating worker preferences when making assignments and sending order details to workers before they actual begin work. In some embodiments, these improvements related to worker satisfaction result in higher worker engagement, a larger labor pool, a stronger brand, and increased efficiency.

Furthermore, some aspects of the present disclosure represent improvements to a mobile application-based system that allows workers to leverage computer technology in their mobile devices (e.g., a GPS, data-rich and interactive user interfaces, various input and output technology, network communication components, remotely updateable software, etc. . . . ) to do their work. Furthermore, aspects of the present disclosure improve communications (e.g., by using less computer resources and improving communication speed) between a computer-based platform and mobile devices that use the mobile application. As will be apparent, these are only some of the advantages offered by aspects of the present disclosure.

FIG. 1 illustrates a schematic diagram of portions of an example supply chain 100. An organization may use aspects of the supply chain 100 to transport items. Aspects of the present disclosure may be used to facilitate transportation of items within the supply chain 100. However, the subject matter of the present disclosure is not limited to working within the supply chain 100. For example, aspects of the present disclosure can also be used to facilitate the transportation of people, or to manage work more generally, such as by matching work with workers in a variety of industries.

The supply chain 100 includes a distribution center 102, stores 104a-c, a location 105, a sortation center 106, and destinations 108a-d. In some examples, the distribution center 102 can be a warehouse, fulfillment center, or other location from which items are stored or distributed. The stores 104a-c can be retail stores having physical locations, or the stores 104a-c can be other locations, such as restaurants, that can receive and send items. In some examples, the stores 104a-c may be different retail locations of a common retailer, and the location 105 may be a store or other location that may not be affiliated with that retailer. The sortation center 106 can be a location between the distribution center 102 and the destinations 108a-d. In some examples, the sortation center 106 may be a mixing center or a fulfillment center. The sortation center 106 may consolidate items from a plurality of other locations, such as the distribution center 102 and the stores 104a-c. Furthermore, in some examples, the sortation center 106 can sort and arrange items for efficient delivery to their next locations, such as the destinations 108a-d. In some embodiments, the destinations 108a-d can be residences, office buildings, post office boxes, or any other locations that items can be delivered to. As will be appreciated, the supply chain 100 can include more or fewer components than those illustrated in the example of FIG. 1. For example, there can be more or fewer distribution centers, stores, sortation centers, final residences, or other locations than those illustrated in the supply chain 100, and there can also be other types of locations or components than those illustrated.

As illustrated by arrows in the example of FIG. 1, items can move through the supply chain 100. For example, items can move from the distribution center 102 to the stores 104a-c or to the sortation center 106; items can move from the stores 104a-c to the sortation center 106 or to one or more of the destinations 108a-d; items can move from location 105 to one or more of the destinations 108a-d; and items can move from the sortation center 106 to one or more of the destinations 108a-d. Some embodiments of the present disclosure relate to managing deliveries from the stores 104a-c or location 105 to the destinations 108a-d, and from the sortation center 106 to the destinations 108a-d.

Figure 2:
FIG. 2 illustrates a network diagram in which aspects of the present disclosure can be implemented.

FIG. 2 illustrates an example work management network environment 200 in which aspects of the present disclosure can be implemented. The network environment 200 includes a work management platform 202, mobile devices 204a-x, a user 206, external systems 208-214, and networks 216a-b. In other examples, the network environment 200 can include more or fewer components than in the example of FIG. 2.

In some examples, the work management platform 202 can manage work by matching work with workers, monitoring work, receiving and transmitting data, and performing other functions. Aspects of the work management platform 202 are further described below. In some embodiments, the mobile devices 204a-x can be phones, tablets, computers, or other computing devices. Each of the mobile devices 204a-x may be associated with a worker. The worker may be a shopper, driver, or other type of worker. In some examples, a mobile application associated with the work management platform 202 may be installed on one or more of the mobile devices 204a-x. In some examples, a user of one of the mobile devices 204a-x may use an instance of the mobile application running on the mobile device to communicate with the work management platform 202.

The user 206 may be an administrator, engineer, or other person that interacts with the work management platform 202. For example, the user 206 may input data into or extract data from the work management platform 202. The external systems 208-214 include systems that may communicate with the work management platform 202. Some of the external systems 208-214 may generate or contain information related to orders, workers, one or more organizations associated with the work management platform, or other information that may be used by the work management platform 202.

For example, the order creation system 208 may organize work into orders, and then send those orders to another system, such as the work management platform 208. In some examples, the order creation system 208 may be integrated with an online system that receives orders (e.g., a website or application). An order may be a task that needs to be completed. For example, an order can be a shopping order, or an order to deliver one or more items from one location to another. Additionally, the order creation system 208 may bundle multiple tasks into one order. Furthermore, in some examples, the order creation system 208 can forecast future work and, based on that forecasted future work, project future orders or future routes. The order creation system 208 can, in some examples, transmit these future orders to the work management platform 202 or transmit the future orders directly to the mobile devices 204a-x. As is further described below, future orders may include some details of what will later become actual orders. In some embodiments, the order creation system 208 may later generate actual orders and transmit the actual orders to the work management platform 202. In some examples, the order creation system 208 may generate orders and future orders for a specific retailer.

In some examples, the location system 210 can generate, retrieve, or store data related to one or more locations. For example, the location system 210 may include—or interface with—a GPS system that can determine the geolocation of one or more of the mobile devices 204a-x, or locations of items, vehicles, or other things that may be of interest to the work management platform 202. The worker registration system 212 may manage registrations of the mobile devices 204a-x and the workers associated with the mobile devices 204a-x. Furthermore, the worker registration system 212 can provide information related to workers or the mobile devices 204a-x to the work management platform 202. The external database 214 can store data related to the work management platform 202, mobile devices 204a-x, the user 206, or other systems, including the external systems 208-214.

As shown, the network 216a couples the work management platform 202 with the mobile devices 204a-x. The network 216b couples the work management platform 202 with the user 206 and the external systems 208-214, and the external systems 208-214 with one another and the user 206. Furthermore, in some embodiments, one or more of the mobile devices 204a-x can communicate with one or more of the user 206 or the external systems 208-214 directly, without communicating via the work management platform 202. Each of networks 216a-b can be, for example, a wireless network, a wired network, a virtual network, the Internet, or any other type of network. Furthermore, each of the networks 216a-b can be divided into subnetworks, and the subnetworks can be different types of networks or the same type of network. The work management platform 202, the mobile devices 204a-x, the user 206, the order creation system 208, the location system 210, the worker registration system 212, and the external database 214 can be implemented in a computing environment such as the computing environment 1802, as is further described below in connection with FIG. 18. Furthermore, in some embodiments, any one or more of the work management platform 202, the mobile devices 204a-x, the user 206, the order creation system 208, the location system 210, the worker registration system 212, and the external database 214 can be implemented in the same computing environment.

Figure 3:
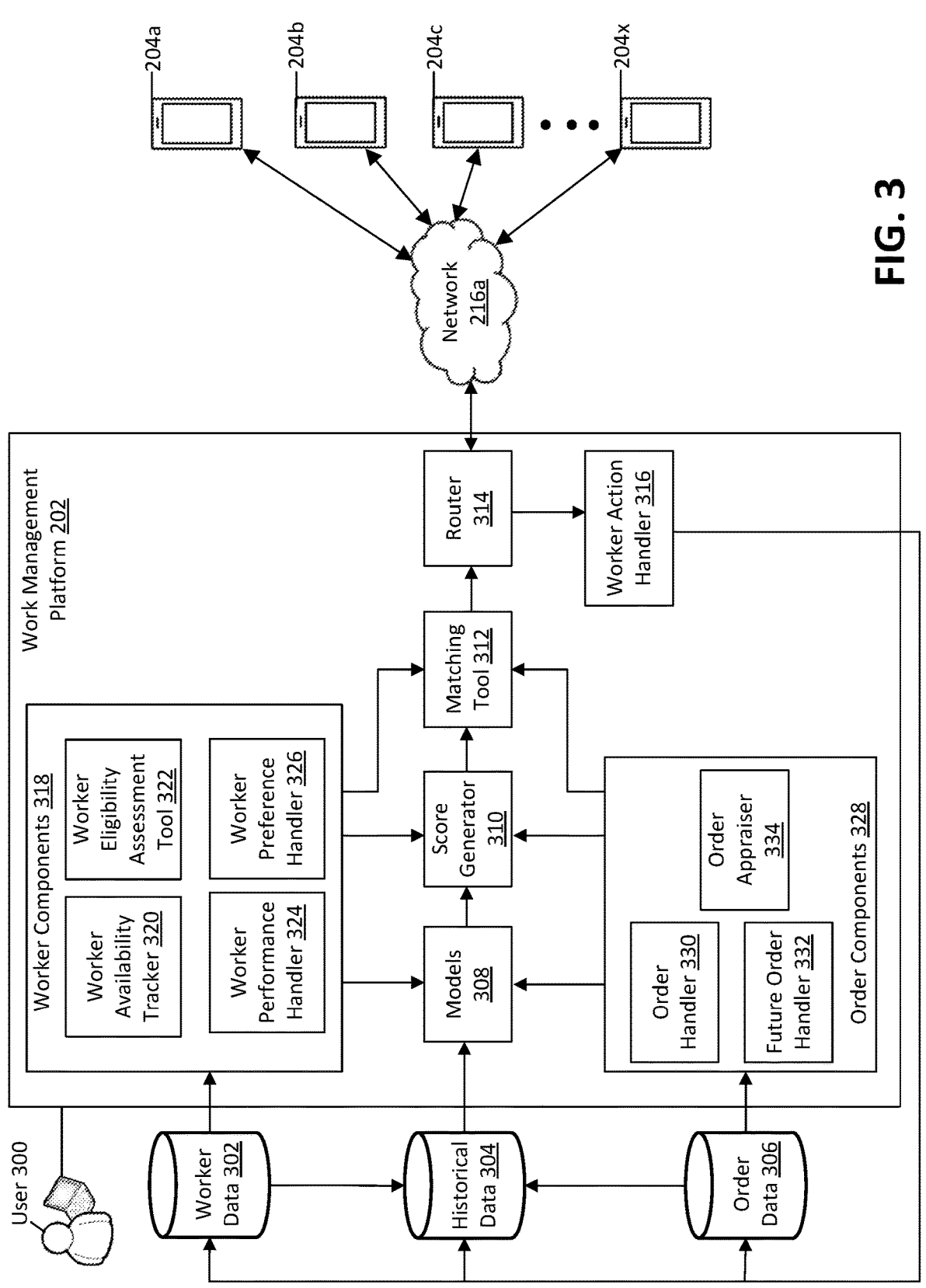
FIG. 3 illustrates a block diagram of aspects of an example architecture of a work management platform.

FIG. 3 illustrates a block diagram of aspects of an example architecture of the work management platform 202 of FIG. 2. FIG. 3 also includes an example user 300, worker data 302, historical data 304, and order data 306. The user 300 may be an administrator or engineer working on the work management platform 202. In some examples, the user 300 may be the same as the user 206 of FIG. 2.

Each of the worker data 302, historical data 304, and the order data 306 is illustrated as an external database containing information that is sent to and used by the work management platform 202. In some embodiments, each of the databases 302-306 may be one or more systems that generates data usable by the work management platform 202. In some embodiments, one or more of the databases 302-306 may include aspects of the external systems 208-

214 of FIG. 2. In some embodiments, one or more of the databases 302-306—or aspects of the databases 302-306—may be part of the work management platform 202, rather than an external system.

The worker data 302 may include data related the workers associated with the mobile devices 204*a-x*. For example, the worker data 302 may include, but is not limited, the following data: worker location data; worker performance data; worker preference data; worker availability data; worker biographical data; worker certification data; worker registration data; and other data related to the workers that may be used by the work management platform 202. As shown in the example of FIG. 3, worker data 302 may be send to one or more of the worker components 318 of the work management platform 202.

The historical data 304 may include data related to past worker behavior and past orders. In some examples, the historical data 304 may include data related to order-worker pairs. For example, the historical data 304 may include data indicating whether a worker was offered an order, whether a worker fulfilled an order, and whether a worker dropped an order. Furthermore, for order-worker pairs, the historical data 304 may include information related to the worker (e.g., from the worker data 302) and information related to the order (e.g., from the order data 306). Additionally, in some embodiments, the historical data 304 may track historical external conditions. For example, the historical data 304 may include information related to time, weather, and other external conditions. In some embodiments, the historical data 304 may also include other data that corresponds to features of the models 308, as is further described below in connection with FIGS. 8A-B and 14A-B.

The order data 306 may include data related to orders that are handled by the work management platform 202. The order data 306 may include characteristics of such orders, including the following: an order time; an order duration; one or more locations associated with an order; an order pay; and other order details that may be used by the work management platform 202. Furthermore, in some embodiments, the order data 306 may include data related to future orders, which may be projected work (e.g., work that is not yet ready to be assigned or completed). In some embodiments, data for the future orders may be estimated data, and there may be less data related to future orders than actual orders. In some embodiments, the future orders may include one or more of an estimated time, estimated location, or an estimated pay. As shown in the example of FIG. 3, order data may be sent to one or more of the order components 328 of the work management platform 202.

As shown in the example of FIG. 3, the work management platform 202 may include a plurality of components. In some embodiments, the components may include software, hardware, or a combination of software and hardware. Depending on the embodiment, the components and the interactions between components may vary. In some embodiments, one or more of the components may be implemented in a computing environment, such as the computing environment 1802, which is further described below. FIG. 3 illustrates a schematic example of some possible components of the work management platform 202 and aspects of an example configuration of the components. In the example of FIG. 3, the components are described as having certain characteristics and performing certain function. In other examples, the work management platform 202 may have different components than those illustrated, and the components may perform different functions.

In the example of FIG. 3, the work management platform 202 includes models 308, a score generator 310, a matching tool 312, a router 314, a worker action handler 316, worker components 318, and order components 328.

The models 308 may receive historical data from the historical data 304. For example, the models 308 may receive historical data related to features of the models 308. In some embodiments, the models 308 may use machine learning techniques, and they may use data received from the historical data 304 to train. Furthermore, the models 308 may receive data from one or more of the worker components 318 and the order components 328. Using this data, the models 308 may perform one or more regression tasks. In some embodiments, the models 308 may output one or more values (e.g., a likelihood that a worker accepts an order if offered, a likelihood that a worker fulfills an order if assigned, and a predicted number of orders that a worker will complete). In the example shown, the models 308, may output values to the score generator 310. In some embodiments, one or more of the models 308 may also output values to other components of the work management platform 202 (e.g., the matching tool 312). Example models of the models 308 are further described below in connection with FIGS. 8A-8B and 14A-B.

The score generator 310 may receive one or more values from the models 308, worker data from the worker components 318 (e.g., worker availability, eligibility, and performance data), and order data from the order components 328 (e.g., order values). In some embodiments, the score generator 310 may determine one or more scores. For examples, the score generator 310 may use, in some embodiments, an objective function to determine one or more scores, such as scores for order-worker pairs. The objective function may use one or more values output by the models 308. In some embodiments, the score generator 310 may consider order values and worker performance as part of generating scores. The score generator 310 may, in some embodiments, generate a plurality of order-worker scores for a plurality of orders and for workers who are eligible to work those orders. In the example shown, the score generator 310 may output a plurality of order-worker scores to the matching tool 312. Examples of determining scores are further described below in connection with FIGS. 4-5, 7, and 12.

The matching tool 312 may receive a plurality of order-worker scores from the score generator 310, worker data from the worker components 318 (e.g., worker preference data), and order data form the order components 328 (e.g., data related to orders and future orders). Using this data, the matching tool 312 may match one or more orders to one or more workers. To do so, the matching tool 312 may, for example, apply an optimization process across the plurality of order-worker scores. For example, the matching tool 312 may use techniques for approaching combinatorial optimization problems, as is further described below. In some embodiments, the matching tool 312 may also use worker preference data or other data, and may need to account for one or more constraints. In some instances, the matching tool 312 may assign an order to a matched worker. In some instances, a match between an order and worker may indicate that the worker will be offered the order. In the example shown, the matching tool 312 may output matched orders and workers to the router 314 and may output other data related to a matched order-worker pair. Examples of matching orders and workers are further described below in connection with FIGS. 4-5, 9, 11-13, and 15.

The router 314 may receive matched orders and workers from the matching tool 312. In some instances, the router may send a communication to one or more of the mobile devices 204a-x. For example, the router 314 may, using data received from the matching tool 312, offer an order to a worker associated with one of the mobile devices 204a-x. As another example, the router 314 may send data related to an assignment of an order to a worker associated with one of the mobile devices 204a-x. Additionally, as illustrated by FIG. 3, the router 314 may also receive information from the mobile devices 204a-x. For example, the router 314 may receive information related to a worker action, such as when a worker accepts, completes, or drops an order. In some embodiments, the router may send data related to worker actions to the worker action handler 316.

The worker action handler 316 may receive data related to worker actions from the router 314. In some embodiments, the worker action handler 316 may transmit data related to worker actions to the databases 302-306. For example, if a worker drops an order, then the worker action handler 316 may receive that action and, according to that action, update the worker data 302, the historical data 304, and the order data 306. The databases 302-306 may then forward the updated data to the work management platform 202, thereby improving the models 308 and updating the data used by the work management platform 202, processes that are further described below. In some embodiments, the worker action handler 316 may send data related to worker actions directly to one or more components of the work management platform 202.

In the example of FIG. 3, the worker components 318 include the worker availability tracker 320, the worker eligibility assessment tool 322, the worker performance handler 324, and the worker preference handler 326. Each of the worker components 318 may receive data from the worker data 302 and, in some embodiments, from other data sources, such as the historical data 304 or the order data 306. Depending on the embodiment, one or more of the worker components 318 may output data to one or more of the components 308-312.

In some embodiments, the worker availability tracker 320 may determine one or more time periods during which a worker may work an order. In some embodiments, the worker availability tracker 320 may determine if a worker is online, if the worker is available at a certain time, or if the worker is available to work a certain order. The worker availability tracker 320 may output worker availability data to another component of the worker components 318 or to one or more of the components 308-312. Examples of determining worker availability are further described below in connection with FIGS. 4-6.

In some embodiments, the worker eligibility assessment tool 322 may receive data from the worker availability tracker 320 and from the order data 306, in addition to receiving data form the worker data 302. In some embodiments, the worker eligibility assessment tool 322 may determine whether a worker is eligible to work an order. For example, the worker eligibility assessment tool 322 may determine whether an order has eligibility requirements and, if so, whether a worker meets those eligibility requirements (e.g., by having the relevant certifications, experience, or resources). Furthermore, in some embodiments, the worker eligibility assessment tool 322 may determine whether a worker is eligible to work an order based on a location of the order and the worker. In some embodiments, the worker eligibility assessment tool may output worker eligibility data to one or more of the components 308-312. Examples of determining worker eligibility are further described below in connection with FIGS. 4-6.

In some embodiments, the worker performance handler 324 may, based at least in part on the data received form the worker data 302, determine one or more performance metrics for a worker. For example, the worker performance handler 324 may calculate how timely or engaged is a worker is. In some embodiments, the worker performance handler 324 may output data to the score generator 310. Examples of evaluating worker performance are further described below in connection with FIG. 7.

In some embodiments, the worker preference handler 326 may receive one or more inputs defining a worker's preference (e.g., preferred location to work, preferred type of work, or another preferred characteristic of an order). Furthermore, the worker preference handler 326 may organize and format worker preferences so that they may be used, in some embodiments, when matching orders and workers. In some embodiments, the worker preference handler 326 may output data to the matching tool 312. Examples of matching orders to workers and accounting for worker preferences are further described below in connection with FIGS. 4-5 and 11-13.

In the example of FIG. 3, the order components 328 include the order handler 330, the future order handler 332, and the order appraiser 334. Each of the order components 328 may receive data from the order data 306 and, in some embodiments, from other data sources, such as the historical data 304 or the worker data 302. Depending on the embodiment, one or more of the order components 328 may output data to one or more of the components 308-312.

In some embodiments, the order handler 330 may manage orders. In some embodiments, the order handler 330 may receive orders from an external source, such as the order data 306. In some embodiments, the order handler 330 may generate orders by assembling data received from the order data 360 or from other sources, such as a customer. In some embodiments, the order handler 330 may determine characteristics of orders that may be input as features into the models 308. Furthermore, in some embodiments, the order handler 330 may track the status of orders (e.g., whether an order is currently being offered and, if so, to which workers; whether an order is eligible to be offered or assigned; whether an order is completed; and whether an order is dropped). In some embodiments, the order handler may transmit data related orders to one or more of the components 308-312.

In some embodiments, the future order handler 332 may manage future orders (e.g., projected work that may be offered to and claimed by workers). In some embodiments, the future order handler 332 may receive future orders from an external system, such as the order data 306. In some embodiments, the future order handler 332 may generate at least part of the future orders. In some embodiments, the future order handler 332 may keep track of a status of future orders. Furthermore, in some embodiments, the future order handler may cause the work management platform 202 to offer future orders to workers, who may claim the future orders. Furthermore, in some embodiments, the future order handler 332 may send future order data to one or more of the components 308-312. For example, as part of actualizing future orders (e.g., as is further described below in connection with FIGS. 11-12), the future order handler may send data related to claimed future orders to the components 308-312.

In some embodiments, the order appraiser 334 may calculate a value of an order. In some embodiments, the value calculated by the order appraiser 334 may be indicative of a value that a particular order has for an entity associated with the work management platform 202. In some embodiments, the order appraiser 334 may determine a value of an order based on the order's revenue or profit. In some embodiments, the order appraiser 334 may send order values to the score generator 310. Determining order values is further described below in connection with FIGS. 4 and 7.

Figure 4:
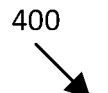
FIG. 4 is a flowchart of an example method useable by a work management platform.
Figure 4:
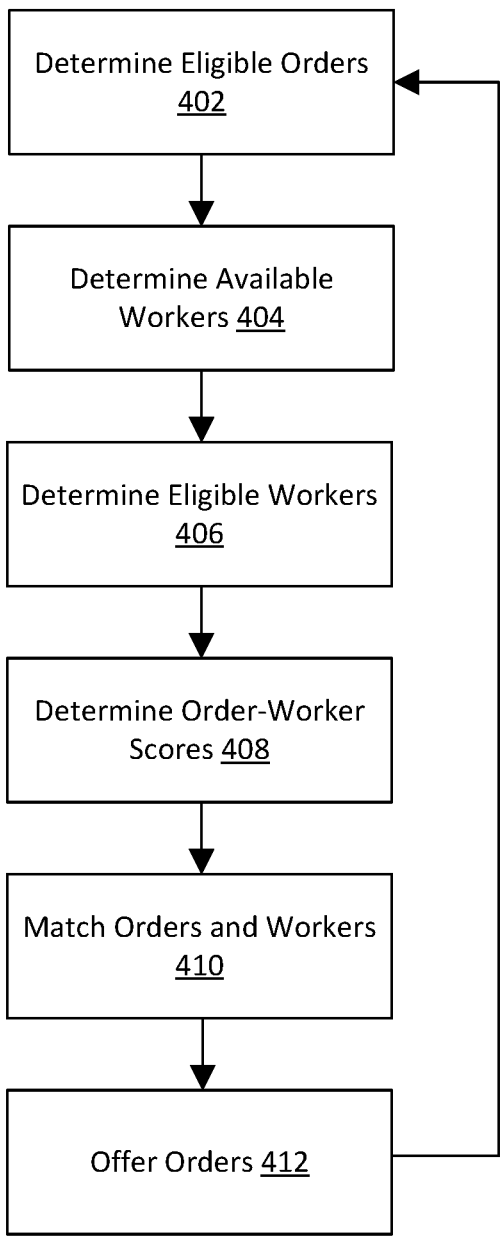
Figure 5:
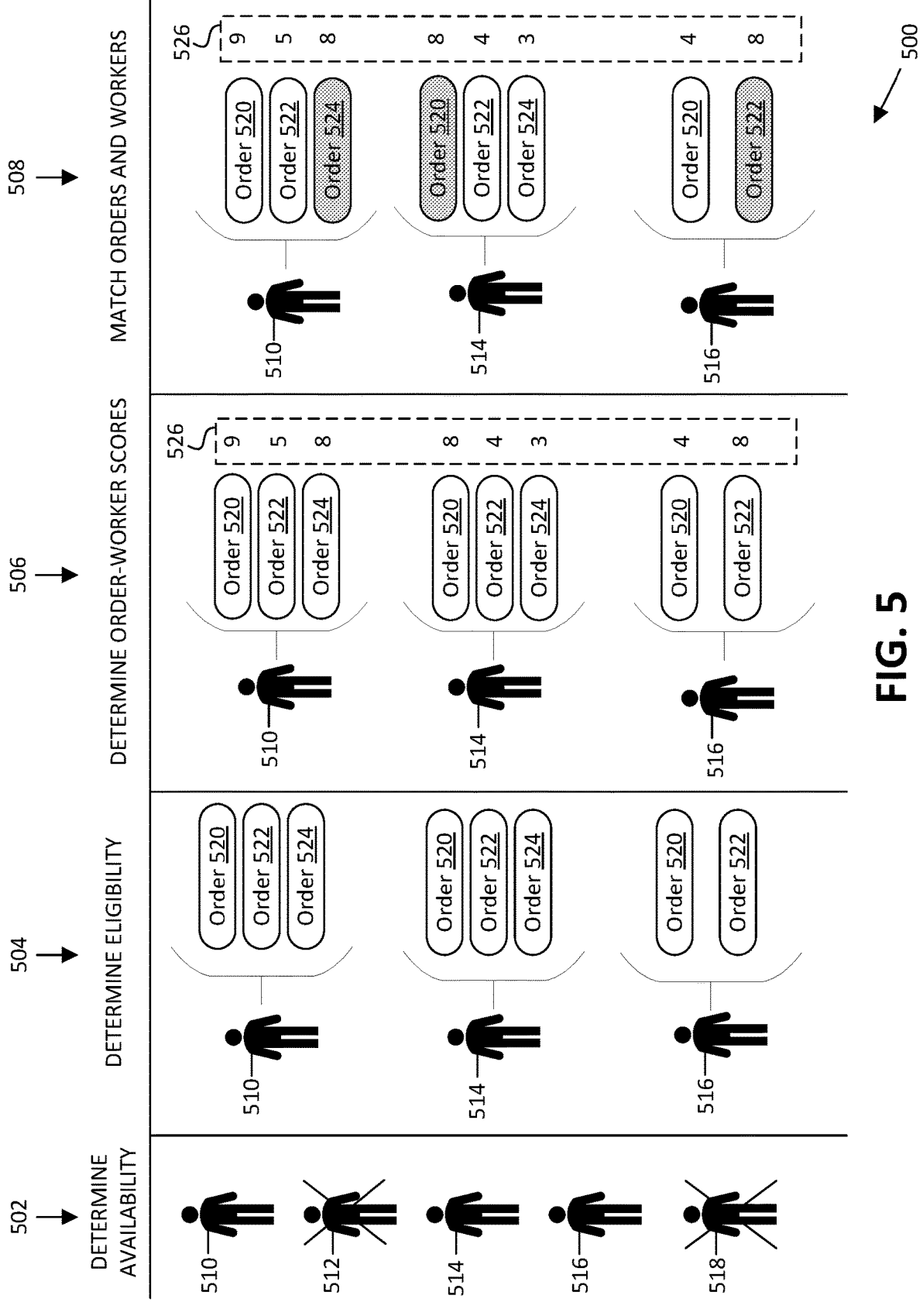
FIG. 5 illustrates a schematic diagram of an example application of aspects of the present disclosure.

FIG. 4 is a flowchart of an example method 400. In some examples, the method 400 can be used by the work management platform 202 to match orders with workers, among other things. A schematic example of aspects of the method 400 is illustrated in FIG. 5.

In the example shown, the work management platform 202 can determine eligible orders (step 402). In some examples, the work management platform 202 can receive one or more orders from an external system, such as the order creation system 208 of FIG. 2. In other examples, one or more components of the work management platform 202 can generate orders. As briefly described above, an order can include pieces of work, such as a shopping or a delivery order, including a single-stop or multi-stop delivery. In some examples, eligible orders can be orders that are ready to be offered or assigned to one or more workers. Furthermore, the work management platform 202 may identify eligible orders as those orders that are located within a particular region. Other types of orders may include those that are not ready to be offered or assigned, those that are completed, those that are in a different region, or those having a different status. In some examples, the work management platform 202 can store and track orders and characteristics of the orders in a table or database, as is further described below in connection with FIG. 10.

In the example shown, the work management platform 202 can determine available workers (step 404). In example embodiments, the work management platform 202 can use one or more availability schedules to determine time periods when various workers are available. In some instances, there may be a pool of workers registered with the work management platform 202 and only a subset of these workers may be available at any given time.

In some examples, the workers may be associated with one of the mobile devices 204*a-x* and may create and submit an availability schedule to the work management platform 202, for example using user interfaces generated at the work management platform 202 for display/access by such workers. The work management platform 202 may use those schedules to determine availability. Furthermore, in some examples, the work management platform 202 can check to see whether workers are online when determining whether they are available. To do so, the work management platform 202 may check whether a worker is currently using—or recently used—a mobile application associated with the work management platform 202. In some examples, the work management platform 202 can determine whether a worker is available for a particular order. That is, the work management platform 202 can compare an availability, or an availability window, of a worker with a time of an order, such as a time by which an order must be started, picked up, or delivered, or a completion window of the order. Further, the work management platform 202 may determine an estimated duration of an order, which may be an estimate of how long it will take the worker to complete the order. Based on the comparison of worker availability and one or more time-related metrics of the order, the work management platform 202 may determine whether the worker is available for that order. One example of determining worker availability is further described in connection with FIG. 6.

In the example shown, the work management platform 202 can determine eligible workers (step 406). In some examples, the work management platform 202 can determine worker eligibility for each order. Furthermore, in some examples, the eligible workers may be a subset of the available workers.

In some examples, a worker may need to meet a number of requirements to be eligible for an order. One requirement may be that the worker has all the necessary certifications. For example, a worker may need a certificate to do any one of the following: buying or delivering pharmaceuticals or alcohol; transporting over a certain number of people, or people under a certain age; transporting animals; working in a certain state; performing a task that requires training; working at certain times; or doing any other work that may need a certification.

Another requirement may be that the worker's location and the order's location correspond. For example, in some examples, workers may select areas that they work, and they will be eligible for orders only within or near those areas. In another example, workers may transmit geolocation data to the work management platform 202, which may determine that a given worker is eligible for an order if locations of that order are sufficiently close to the worker's location (e.g., if the worker is within a particular distance or driving time of a location, such as, e.g., twenty miles or thirty minutes of a starting location of an order). In other examples, the work management platform 202 may determine that the worker's location corresponds with the order by inferring where the worker is going to be. For example, the work management platform may determine that a worker is going to be completing a previous order at a certain time and at a certain ending location. Using this information, the work management platform 202 may determine that the worker is eligible for an order located near the ending location, even though the worker may not be presently located near the ending location. Furthermore, the work management platform 202 may determine location eligibility in other ways, including by dynamically altering a worker's eligibility with respect to location based on a current state of all workers and orders.

Another eligibility requirement may be that the worker is associated with a location (e.g., a sortation center or store) that the order is likewise associated with. Another requirement may be that the worker not be blocked from being matched with the order. For example, if the worker was already assigned to the order and dropped it, that worker may not, in some embodiments, be eligible for that order. As another example, an order may be associated with a customer or organization that, for whatever reason, deems the worker ineligible for that order. For example, the customer or organization may have had a negative experience with that worker (e.g., gave that worker a poor rating or review), or the organization may have other restrictions related to orders, resulting in the worker being ineligible for the order. Another requirement may be that the worker not already be scheduled for other work that may conflict with the work, or that the worker not already be assigned to too many orders within a given timeframe, such as a given day, week, or month.

Although illustrated as separate steps, determining worker availability (step 404) and determining worker eligibility (step 406) may overlap in some embodiments. Additionally, in some embodiments, a particular factor may be considered in determining availability rather than eligibility, or vice-versa, and in other embodiments, that factor may be considered elsewhere. For example, in some embodiments, location data may be used in determining both availability and eligibility. Or in some embodiment, location data may be used in determining availability but not eligibility, or vice-versa.

In the example shown, the work management platform 202 can determine order-worker scores (step 408). In example aspects, the work management platform 202 can determine a plurality of order-worker scores for a plurality of orders and a plurality of workers. Each of the order-worker scores can be for a pairing of one order of the plurality of orders with one worker of the plurality of works. In some examples, the plurality of orders can be orders that are eligible to be offered or assigned to workers. In some examples, such orders are currently ready to be fulfilled or will be ready to be fulfilled soon. As to the workers, in some examples, the plurality of workers can include all possible workers, or can include a subset of workers, such as available workers. In some embodiments, an order-worker score can, for each order, be determined for each worker that is eligible for that order. In such an example, determining the order-worker scores may result in a two-dimensional matrix with each score being associated with an order and a worker eligible for that order.

To determine the order-worker scores, the work management platform 202 may, for each order-worker pair, use one or more values from one or more models as part of determining the order-worker score. As model inputs for the one or more models, the work management platform 202 may use data or characteristics related to the order or worker that the platform is determining the order-worker score for. The model inputs may, for example, include order details and past worker behavior. The models and model inputs are further described below, for example in connection with FIGS. 7 and 8A-8B.

In some examples, the work management platform can use an objective function that combines multiple values to determine the order-worker score for an order-worker pairing. In some embodiments, this objective function may combine two likelihoods for an order-worker pairing: an order-worker selection likelihood; and an order-worker completion likelihood. In some examples, each of the order-worker selection likelihood and the order-worker completion likelihood may be derived by models. The objective function may also, in some examples, include other values, such as an order value, one or more worker performance metrics, or one or more other variables, such as a variable providing boost for new workers. An example method for determining order-worker scores is further described below in connection with FIG. 7.

In the example shown, the work management platform 202 can match orders and workers (step 410). The work management platform 202 may use the order-worker scores to match each of the orders to one or more workers. To do so, the work management platform 202 may apply an optimization process across the plurality of order-worker scores. In some embodiments, the work management platform 202 can approach the matching as a combinatorial optimization problem. For example, the work management platform 202 may seek to optimize a metric under one or more constraints. To do so, the work management platform 202 may use search algorithms, enumeration methods, linear programming, dynamic programming, approximation methods, or other techniques. For example, the work management platform 202 may seek, in some examples, to maximize a total of order-worker scores. For example, the work management platform 202 may select a plurality of order-worker scores that maximizes or approximately maximizes the total of selected order-worker scores. Then the work management platform 202 may match, for each selected score, the order and worker associated with that score. Furthermore, the work management platform 202 may store data indicating the order-worker matches and details related to the matches.

While optimizing the metric, the work management platform 202 may have to account for constraints. For examples, a worker may not be able to be matched with more than a certain number of orders. Thus, even if there is a high order-worker score for a given worker and order, that worker and order may not be matched if that worker is already matched with too many other orders. Furthermore, the work management platform 202 may account for the entire market state-which may include orders, workers, and order-worker scores-when matching the orders and workers. For example, matching an order-worker pair may mean that the order cannot be matched with another worker, or the worker with another order. Although a first worker and an order may have a high order-worker score, they may not be matched if there is another order-worker score that—although lower—is associated with a second worker who only has a high score for that order. Thus, by accounting for the broader context of all orders, workers, and order-worker scores-rather than only accounting for a particular worker, order, and order-worker score—the work management platform 202 is more likely to make matches that improve overall workflow and management, thereby reducing the amount of additional resource expenditure on the part of the work management platform 202, thus improving overall outcomes, and improving the experience of the workers.

In the example shown, the work management platform 202 may offer orders (step 412). For example, the work management platform 202 may, for each order, offer the order to the one or more workers that the order was matched with. To do so, the work management platform 202 may transmit a notification and other information to one or more of the mobile devices 204a-x associated with the workers receiving the offers. The notification may be a push notification informing the worker about the offer. The order details may include a time, duration, pay, location, organization, or other information related to the offered order. Furthermore, the work management platform 202 may store information tracking the offered orders and their status. An example of aspects of offering orders is further described below in connection with FIG. 16. Furthermore, having transmitted the offer to a worker, the work management platform 202 may receive a communication from the worker, as is further described in connection with FIG. 9.

In some examples, the work management platform 202 may repeat one or more of steps 402-412. Specifically, in some examples the work management platform 202 may repeat one or more of the steps 402-412 in response to an event (e.g., receiving information or a notification from one or more external systems 208-214 or one or more of the mobile devices 204a-x) or in response to the passage of a predetermined amount of time, such as thirty seconds, a minute, five minutes, or another amount of time.

For example, the work management platform 202 may again determine eligible orders (e.g., returning to step 402). In doing so, the work management platform 202 may determine a different set of eligible orders than previously. For example, one or more of the previously eligible orders may have been accepted by a worker, thereby becoming ineligible to be offered to another worker. Or one or more orders may have been dropped or newly generated, possibly becoming eligible orders. Furthermore, one or more characteristics of the orders may have changed. For example, an order may have been offered to a worker and be pending, or an order's time until late may have decreased, making that order a priority. Furthermore, the work management platform 202 may redetermine the order-worker scores. In some embodiments, when repeating the steps of the method 400, the values determined by the work management platform 202 may change, including the pool of available workers, the pool of eligible workers, the order-worker scores, and the order-worker matches, given for example, the changes in the underlying data.

In some examples, the work management platform 202 can, by repeating one or more steps of the method 400, maintain an up-to-date state of orders and workers, and be continually making new offers to workers when necessary. Accordingly, the work management platform 202 may adapt in real time to changes in the market, thereby calculating more informed order-worker scores, resulting in more efficient, more optimal matches and offers. In an industry with gig workers, tight deadlines, and frequent changes, the ability of the work management platform 202 to intelligently respond to changes in near real time may result in a system that minimizes costs by making less suboptimal decisions, improves metrics such as on-time delivery, and saves resources, such as computing resources and time, for a work management system that makes extensive use of computer technology.

FIG. 5 illustrates a schematic diagram of an example 500 of aspects of the present disclosure. For example, the example 500 illustrates an example application of aspects of the method 400. In the example 500, four steps are shown: determine availability 502, determine eligibility 504, determine order-worker scores 506, and match orders and workers 508. As discussed above in connection with FIG. 4, the work management platform 202 can perform operations other than those illustrated in the example 500.

As shown in the example step of determining availability 502, the work management platform 202 can determine worker availability. The workers 510-518 may be workers of a pool of workers. In an example, the workers 510-518 may be all the registered workers to perform one or more of the eligible orders. By determining availability, the work management platform 202 may determine which of the workers 510-518 are available to work one or more of the eligible orders. As discussed above, workers may be available at a given time if they have indicated that they are available to work at that time, or if they are using a mobile application associated with the work management platform 202 at that time. Furthermore, in some embodiments, other factors, such as geographical location, may be considered when determining availability. As shown in the example 500, workers 512 and 518 are not available (as indicated by an X), but the workers 510, 514, and 516 are available.

As shown in the example step of determining eligibility 504, the work management platform 202 can determine which workers are eligible to work which orders, a process described above in connection with FIG. 4. As shown, the workers 510 and 514 are eligible to work the orders 520-524, whereas the worker 516 is eligible only to work the orders 520-522.

As shown in the example step of determining order-worker scores 506, the work management platform 202 can determine a plurality of order-worker scores 526, a process further described in connection with FIGS. 4 and 7. The plurality of order-worker scores 526 can include an order-worker score for each order and eligible worker for that order. In some examples, the work management platform 202 can determine an order-worker score for each order and each worker—irrespective of eligibility—and use a placeholder value (e.g., "0") for order-worker scores involving an order and a worker ineligible to work that order.

In the example 500, for instance, the order-worker score for the pairing of the worker 510 and the order 520 is "9," the order-worker score for the pairing of the worker 514 and the order 522 is "4," and so on. As described above in connection with FIG. 4 and below in connection with FIGS. 7-8, determining each of the order-worker scores can use models having at least some inputs related to the particular worker and the particular order of the order-worker pair. For example, the work management platform 202, to derive the score "9" for the worker 510-order 520 pair, can use past behavioral data of the worker 510 and characteristics of the order 520 as inputs into models trained on such data to predict, for example, the likelihood that the worker 510 would accept the order 520 if offered or the likelihood that, if assigned, the worker 510 would complete the order 520, a process further described below in connection with FIGS. 7-8.

As shown in the example step of matching orders and workers 508, the work management platform 202 can match each of the orders 520-524 to one or more of the workers 510, 514, 516. To do so, the work management platform 202 can apply, as described above in connection with FIG. 4, one or more approaches of finding solutions to combinatorial optimization problems. As a result, in the example 500, the work management platform 202 can match the worker 510 with the order 524, the worker 514 with the order 520, and the worker 516 with the order 522. Under an example constraint of the example 500 that each worker be assigned exactly one order, it can be appreciated that the matchings illustrated represent a maximum total order-worker score. Having made the matches, the work management platform 202 can, in some examples, send offers to the matched workers. For example, the work management platform 202 can offer the order 524 to the worker 510, the order 520 to the worker 514, and the order 522 to the worker 516.

Figure 6:
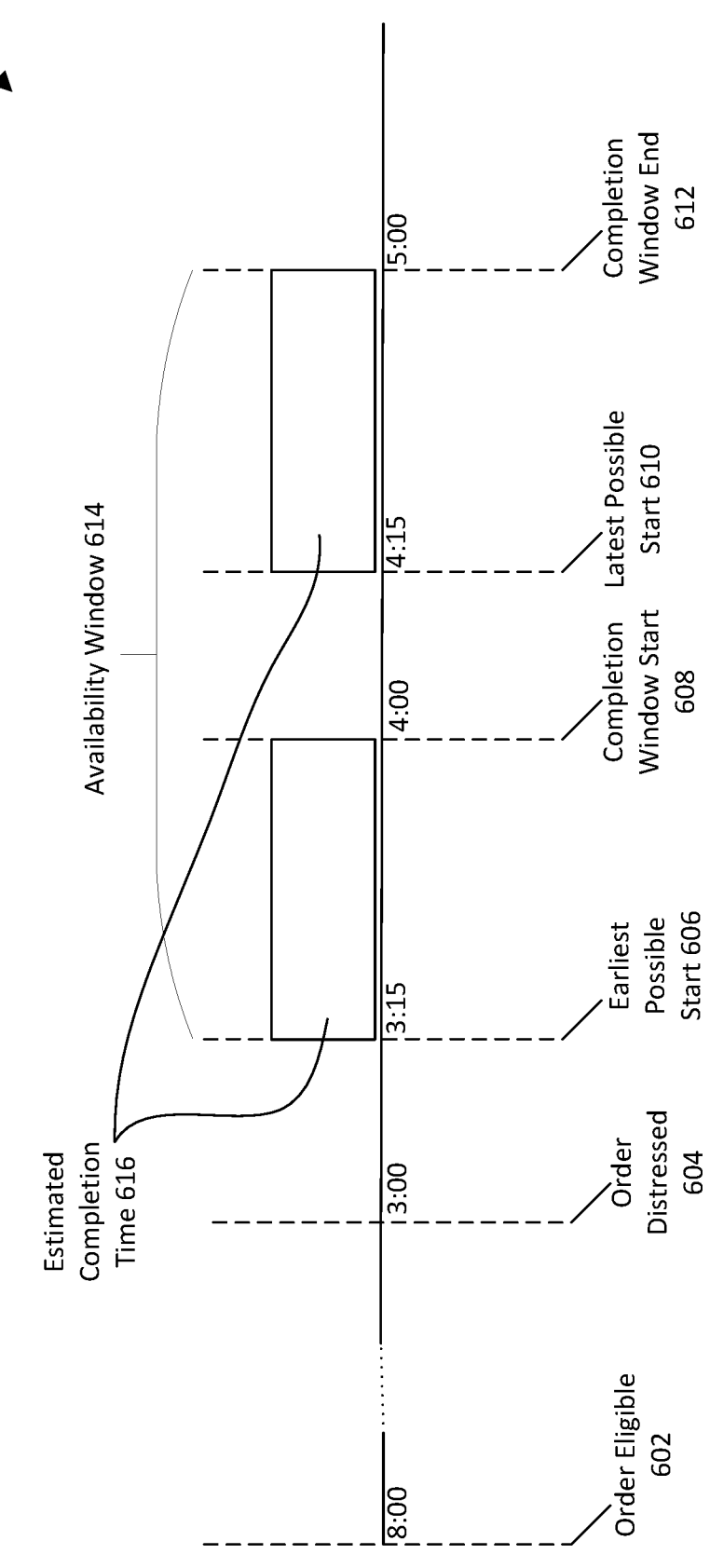
FIG. 6 is a schematic diagram of an example order lifecycle.

FIG. 6 is a schematic diagram of an example order lifecycle 600. The example order lifecycle 600 can be for an example order of a plurality of orders. For example, it may be one of the orders determined to be eligible by the work management platform 202 in step 402 of FIG. 4. In the order lifecycle 600, six points of time are illustrated: order eligible 602 (at 8:00 am); order distressed 604 (at 3:00 pm); earliest possible start 606 (at 3:15); completion window start 608 (at 4:00 pm); latest possible start 610 (at 4:15); and completion window end 612 (at 5:00).

In the example shown, the order eligible time 602 may indicate the time at which the order becomes eligible. In some examples, an order may be eligible when it is ready to be offered to or assigned to a worker. The order eligible time 602 may also be the same time that the order is created, or it can be a later time. In the example shown, the order eligible time 602 is on the same day that the order is scheduled to be completed; however, for other orders, or in other examples, the order may become eligible before the day that it is scheduled to be delivered. Furthermore, the order may become eligible in response to being dropped by a worker previously assigned to complete the order.

In the example shown, the order distressed time 604 may indicate that the order is scheduled to be completed soon. Furthermore, if the order has not yet been accepted or assigned by the order distressed time 604, then the work management platform 202 may respond. For example, the work management platform 202 may offer the order to more workers, assign the order to a worker, offer incentives for workers to take the order, outsource the order to a third-party company, or otherwise alter the state of the order so that it is completed on time.

In the example shown, the earliest possible start time 606 may indicate the earliest time that a worker may start to work on the order. For example, for the order in the order lifecycle 600, the estimated completion time 616 is 45 minutes, and the order has a completion window start 608 that is at 4:00 pm and a completion window end 612 that is at 5:00. Thus, the earliest time that a worker may begin to perform the work is 3:15 pm, which is 45 minutes before the completion window start 608. Furthermore, the latest possible start 610 is at 4:15, which is 45 minutes before the completion window end 612. In other examples, there may not be an estimated completed time, there may not be a completion window, or it may be acceptable that the order is completed early or late. In such instances, the order lifecycle 600 may have a different earliest possible start time 606, ranging, for example, from the time that the order is eligible to the last time that the order may be delivered.

In the example shown, the availability window 614 ranges from the earliest possible start 606 to the completion window end 612. In some embodiments, one way for a worker to be available for the order of the order lifecycle 600 is for the worker to be available for at least 45 consecutive minutes (e.g., the estimated completion time 616) within the availability window 614. If a worker is not available for at least 45 consecutive minutes during the availability window 614, then the worker may not be available for the order. The work management platform 202 may provide a user interface to workers for them to indicate their availability. In some embodiments, workers may be available for an order if they are online. For example, if they are using the mobile application associated with the work management platform 202, then they may be deemed available for an order, even if the worker had not previously indicated that they would be available for that time. Furthermore, the work management platform 202 is not limited to determining availability in these ways. Additionally, some considerations for worker availability can, depending on the embodiment, overlap with considerations for eligibility, and vice-versa, as described above in connection with FIG. 4.

Figure 7:
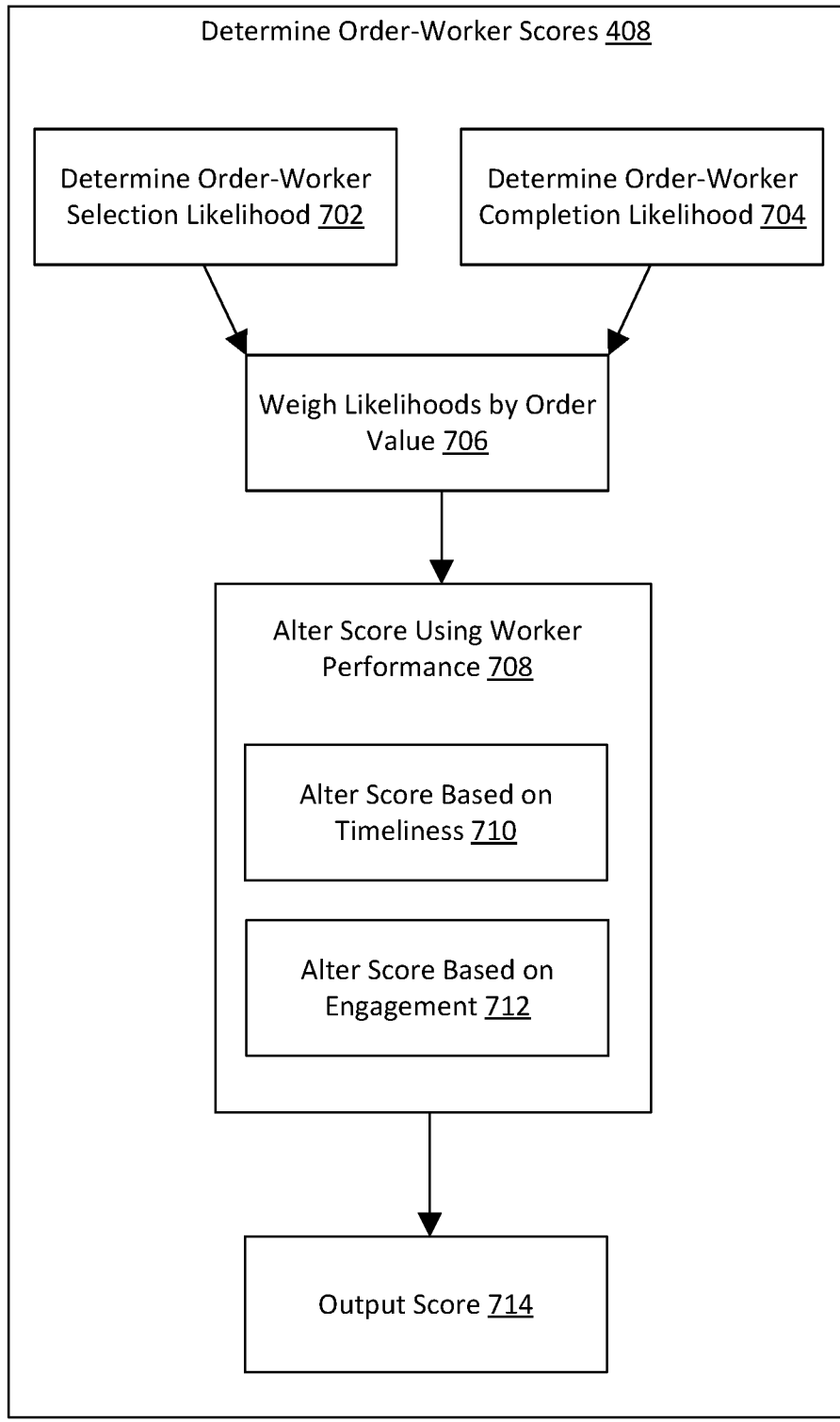
FIG. 7 is a flowchart of an example method for determining order-worker scores.

FIG. 7 is a flowchart of an example method 700 useable by the work management platform 202. In some examples, the work management platform 202 may use the method 700 as part of determining order-worker scores 408, a step in the method 400 of FIG. 4. For example, the work management platform 202 may, for each order of a plurality of orders, apply the method 700 for each worker of the plurality of workers, or for each worker of a plurality of workers eligible to work that order. That is, the work management platform 202 may, in some examples, apply the method 700 for each order-worker pair of a plurality order-worker pairs.

In the example shown, the work management platform 202 can determine an order-worker selection likelihood (step 702). The order-worker selection likelihood may indicate, for the order-worker pairing, a probability that the worker will select the order if it is offered to the worker. Selecting the order may include accepting the order as opposed to denying or ignoring it, or selecting the order from one of multiple offered orders. The order-worker selection likelihood may be derived from an order-worker selection model, which is further described below in connection with FIG. 8A.

In the example shown, the work management platform 202 can determine an order-worker completion likelihood (step 704). The order-worker completion likelihood may indicate, for the order-worker pairing, the probability that the worker will complete the order if the order is assigned to the worker. For example, if the worker already selected or accepted the order, or if the order had already been assigned to the worker, the order-worker completion likelihood indicates the probability that the worker actually completes the order, as opposed to dropping it or failing to complete it. The order-worker completion likelihood may be derived from an order-worker completion model, which is further described below in connection with FIG. 8B.

As illustrated by the example of FIG. 7, determining the order-worker selection likelihood (step 702) and determining the order-worker completion likelihood (step 704) may be performed in parallel. In some examples, neither process is dependent on an output of the other, resulting in faster computing times and a more responsive work management platform 202.

In the example shown, the work management platform 202 may weigh the order-worker selection likelihood and the order-worker completion likelihood by an order value (step 706). For example, the order may have an associated value. In some embodiments, the value may be related to the revenue or profit associated with the order; in other embodiments, the order value may be adjusted based on the importance of the customer making the order or the entity sending the order; and in other embodiments, the order value may in some other way quantify a value of the order. In the shipping industry, for example, the order value may be equal to a number of stops multiplied by an average dollar amount per stop. However it is calculated, the order value may be used to weigh the order-worker score that is associated with that order. For example, the order-worker selection likelihood, the order-worker completion likelihood, and the order value may be combined in an objective function. In some examples, the objective function may include a multiplication of the order value by the order-worker selection likelihood and the order-worker completion likelihood, as illustrated below in Equation (1):

$$\mu_{0,w} = PSL_{o,w} \times PCL_{o,w} \times V_o \qquad (1)$$

Where $\mu_{o,w}$ is the order-worker score for the pairing of an order o and worker w; $PSL_{o,w}$ is the order-worker selection likelihood for the pairing of the order o and worker w; $PCL_{o,w}$ is the order-worker completion likelihood for the pairing of the order o and worker w; and $V_o$ is a value of the order o.

Furthermore, in some embodiments, the work management platform 202 may account, as part of determining order-worker scores, for the situation in which a worker selects an order but then drops it. In such a situation, the objective function may include a value of reassignment, which may correspond with the value of an order if it is reassigned. In some examples, the value of reassignment may be a fraction of the original value of the order, because some value of the order may be lost due to overhead costs if the order must be reassigned. Additionally, in some examples, the value of reassignment may be further reduced if additional pay or resources must be spent to complete a dropped and reassigned order (e.g., if incentive pay must be offered for a new worker to take the dropped order, or if the order must be outsourced to a third party). Equation (2) illustrates an example objective function that accounts for the value of reassignment:

$$\mu_{0,w} = PSL_{o,w} \times PCL_{o,w} \times V_o + PSL_{o,w} \times (1 - PCL_{o,w}) \times VRA_o \qquad (2)$$

Where $VRA_o$ is the value of reassignment of the order.

In the example shown, the work management platform 202 may alter the order-worker score by accounting for worker performance (step 708). To do so, the work management platform 202 may, in some examples, add variables to the objective function to account for worker performance, thereby altering the order-worker scores but not altering any underlying models, such as the order-worker selection model or the order-worker completion model. For example, the work management platform 202 may alter order-worker scores based on the timeliness (e.g., step 710), engagement (e.g., step 712), or other performance metric of the worker. In the following example of Equation 3, a value for timeliness and engagement are included in the objective function to alter the order-worker score:

$$\mu_{0,w} = (PSL_{o,w} \times PCL_{o,w} \times V_o) + (V_o \times T_w) + (V_o \times E_w) \qquad (3)$$

Where $T_w$ is a timeliness score of the worker w, and $E_w$ is an engagement score of the worker w. In some examples, the timeliness and engagement scores can be numbers between zero and one, thereby adding or subtracting a percentage of the value of the order to the order-worker score. Furthermore, the timeliness score, engagement score, or other score can be scaled. For example, the timeliness score may be scaled so that it is a number between 0 and 0.05; as a result, the maximum increment provided by the timeliness value to the overall order-value score would be 5% of the value of the order. In some examples, the engagement score may be scaled to a different range of number than the timeliness score. For example, the engagement score may be scaled so that it is a number between 0 and 0.03, and as a result, the maximum increment provided by the engagement value to the overall order-worker score would be 3% of the value of the order. In some examples, the values related to worker performance, such as timeliness and engagement, may be negative, thereby decreasing the order-worker score.

In other examples, the work management platform 202 may alter order-worker scores based on worker performance using other objective functions. In the following example of Equation 4, another example objective function that accounts for worker performance is illustrated:

$$\mu_{0,w} = PSL_{o,w} \times PCL_{o,w} \times (1 + T_w + E_w) \times V_o \qquad (4)$$

In some examples, a user may input a range of scores that each worker performance variable is scaled to (e.g., a range between 0 and 0.05). In other examples, the range of scores may be dynamically changed based on the state of the market (e.g., the number or characteristics of eligible or available workers or the number of or characteristics of eligible orders), or the work management platform 202 may use one or more models to determine the range of scores (e.g., selecting values that adequately account for worker performance for important orders, but that otherwise do not over-distort optimized matching based on other models, such as the order-worker selection model and the order-worker completion model). Furthermore, in some examples, timeliness can be included in the objective function, but not engagement, or vice-versa. Furthermore, in some examples, other values related to worker performance can be included as adjustments in the objective function. For example, in some embodiments, the work management platform 202 may increase order-worker scores for new workers.

In the example shown, the work management platform 202 may alter the order-worker score based on timeliness (step 710). The timeliness score for a worker may be associated with how timely the worker has historically completed orders. For example, an order may be timely completed if that order is completed within a completion window or if it is completed by a certain time. For a given worker, as the percentage of timely completed orders increases, the worker's timeliness score may increase. Additionally, in some examples, a worker's timeliness score may depend on whether the worker completes orders within a reasonable time, irrespective of whether the order ends up being late. For example, the work management platform 202 may compare the completion time of an order to an expected completion time for that order, such as the estimated completion time 616 of FIG. 6. Based on that comparison, the work management platform 202 may alter the worker's timeliness score (e.g., by decreasing the timeliness score if the completion time was greater than the expected completion time, or by increasing the timeliness score if the completion time was less than or equal to the expected completion time). Additionally, the work management platform 202 may alter—or decide not to alter—a worker's timeliness score based on other considerations. For example, if a worker selects an order that is close to being late, then that worker's timeliness score may not be decreased if the order is not completed on time, because doing so may disincentive workers to select orders that are close to being late, such as orders that are closed to being distressed or that are distressed. Furthermore, regardless of how the timeliness score is determined, it may be scaled, as described above, to a certain range to manage its impact in the objective function.

In the example shown, the work management platform 202 may alter the order-worker score based on an engagement score (step 712). The engagement score for a worker may be associated with how frequently the worker works, or with how much work that the worker does when they work. Relatedly, the engagement score may also be related to how much experience a worker has. For example, if a worker works every day, then they may have a high engagement score; alternatively, if the worker only works a few days a week, but fulfills many orders on those days, then the worker may likewise have a high engagement score. Furthermore, a worker that works particular days (e.g., weekends) may have a higher engagement score, because it may be difficult to find other workers for those days. In some examples, the engagement score may be a combination of different scores that relate to worker engagement. Furthermore, as described above, the engagement score may be scaled to a certain range to manage its effect on the objective function.

In the example shown, the work management platform 202 may output the order-worker score (step 714). For example, the work management platform 202 may output the score for use in further processes (e.g., the method 400 of FIG. 4). Furthermore, as described above, the work management platform 202 may repeat the method 700 to determine a plurality of order-worker scores for a plurality of orders and a plurality of workers.

Figure 8A:
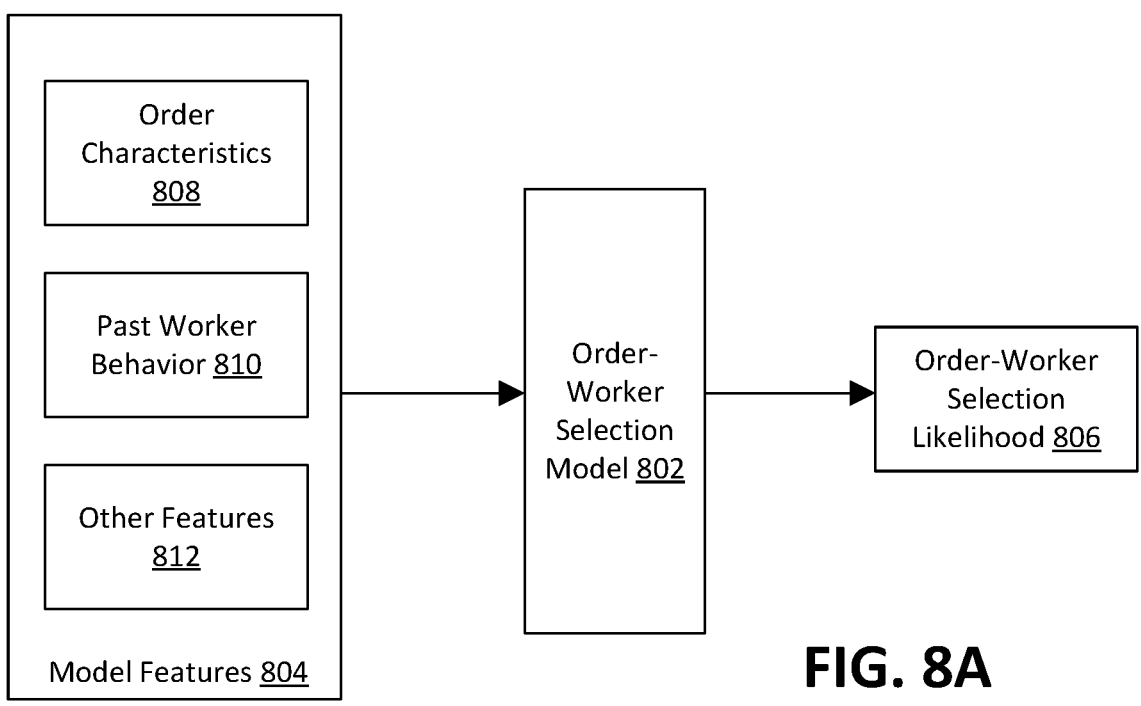
FIG. 8A illustrates a block diagram of a model for determining an order-worker selection likelihood.

FIG. 8A illustrates a block diagram of a model for determining an order-worker selection likelihood. FIG. 8A includes an order-worker selection model 802, model features 804, and an order-worker selection likelihood 806. The model features 804 may include a plurality of features, including order characteristics 808, past worker behavior 810, and other features 812.

Figure 8B:
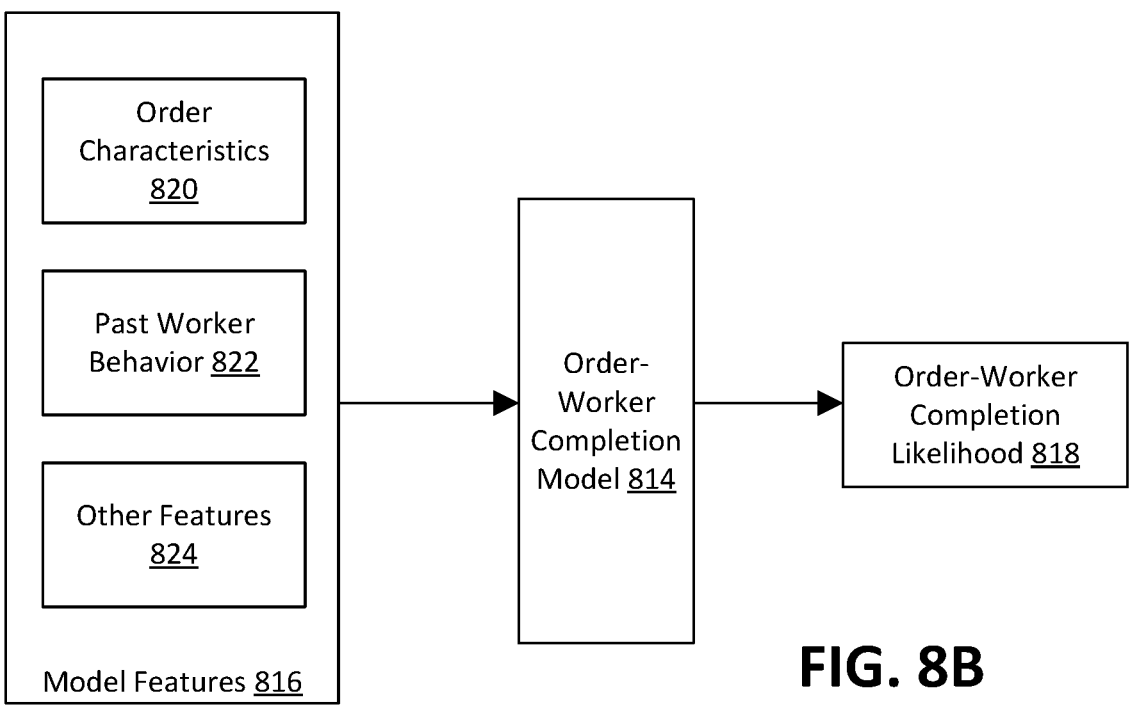
FIG. 8B illustrates a block diagram of a model for determining an order-worker completion likelihood.

FIG. 8B illustrates a block diagram of a model for determining an order-worker completion likelihood. FIG. 8B includes an order-worker completion model 814, model features 816, and an order-worker completion likelihood 818. The model features 816 may include a plurality of features, including order characteristics 820, past worker behavior 822, and other features 824.

The order-worker selection model 802 and the order-worker completion model 814 can be models that implement machine learning techniques to perform regression tasks. For example, once trained, the order-worker selection model 802 may receive, as an input, values (e.g., numbers) for each of one or more of the model features 804. Based on these values, the order-worker selection model 802 may output a probability that a worker will select an order if offered. As to the order-worker completion model 814, it can receive, as an input, values (e.g., numbers) for each of one or more of the model features 816. Based on these values, the order-worker completion model 814 may output a probability that a worker will complete an order, assuming that the worker is assigned to that order.

The work management platform 202 may train the models 802 and 814 on a plurality of model features, or model inputs. In some examples, the training can be supervised. As training data, the models 802 and 814 may use past data that correspond to the model features 804 and 816, respectively. For example, the model 802 may train using order characteristics of past order data, past worker behavior data, and other past data. Furthermore, the model 814 may train using order characteristics of past order data, past worker behavior data, and other past data.

As an example, for an instance of the training data, the order-worker selection model 802 may use past data related to a particular order and worker to predict a likelihood that the worker would select the order, and then the order-worker selection model 802 may compare the predicted likelihood to the value indicating whether the worker selected that order. Based on this comparison, one or more parameters of the order-worker selection model 802 may be changed so that when the order-worker selection model 802 receives future data related to workers or orders, the model 802 will more accurately predict whether workers will select orders if offered. Similarly, the work management platform 202 may train the order-worker completion model 814 with training data, except that the order-worker completion model 814 may be trained to predict a likelihood that a worker will complete an order if that worker is already assigned to that order.

In some examples, the models 802 and 814 may use one or more of logistic regression, support-vector machines (SVMs), deep learning, neural networks, gradient boosting, decision trees, random forests, or other techniques related to regression or machine learning. In some embodiments, one or more of the models 802 and 814 may use eXtreme Gradient Boosting (XGBoost). In some embodiments, one or more of the models 802 and 814 may use Light Gradient-Boosting Machine (LightGBM).

The model features 804 can, in some examples, include order characteristics 808, past worker behavior 810, and other features 812. The order characteristics 808 can be features that relate to characteristics of a particular order. For example, the order characteristics 808 may include the following: pay; duration; order type; one or more locations associated with the order (e.g., origin or destination locations); a zone; an organization associated with an order (e.g., a particular store); time until the order is late; time that the order has been eligible; characteristics of one or more locations associated with the order (e.g., characteristics of one or more pickup locations or one or more drop-off locations); how many times the order has been dropped; the similarity of the order to other orders; whether the order belongs to a group of other orders; or other characteristics or data related to the order.

The past worker behavior 810 can include features related to past behavior of a particular worker. For example, the features for past worker behavior 810 may include the number of orders fulfilled by the worker in the past hour, day, or week. Furthermore, the model features 804 can include other features 812. The other features 812 may relate to the worker, order, or other data that, when evaluated by the order-worker selection model 802, improves its accuracy in predicting a likelihood that a worker will select an order if offered.

At least some of the feature of the model features 816 can be different than the model features 804, as the feature sets are for different models. For example, some of the order characteristics 820 may be different than the order characteristics 808, even though they may both relate to a particular order. Likewise, some of the features for past worker behavior 822 may be different that the features for past worker behavior 810.

The order characteristics 820 can be features that relate to characteristics of a particular order. For example, the order characteristics 820 may include the following: pay; duration; a distance from a pickup to a drop-off; order type; one or more locations associated with the order (e.g., origin or destination locations); a zone; an organization associated with an order (e.g., a particular store); time until the order is late; time until the order is in jeopardy; time that the order has been assigned; a day or time that the order was assigned; characteristics of one or more locations associated with the order (e.g., characteristics of one or more pickup locations or one or more drop-off locations); how many times the order has been dropped; the similarity of the order to other orders; whether the order belongs to a group of other orders; or other characteristics or data related to the order.

The past worker behavior 822 can include features related to past behavior of a particular worker. For example, the features for past worker behavior 822 may include the following: drop ratio (e.g., the number of orders dropped by a worker compared to the number of orders assigned or completed) in the last year, month, twenty-one days, week, or other amount of time; number of drops; completion ratio; number of completed orders; number of orders assigned to the worker; or number of orders offered to the worker. Furthermore, there can be features that may use data from both an order and a worker, such as the following: a distance between one or more locations of the order to a location associated with the worker; a similarity of a location of the order to a location of an order that the worker previously completed; a similarity of a time of the order to a time of an order that the worker previously completed; a similarity of the type of the order to the type of an order that the worker previously completed; or other features that relate to both characteristics of the order and to past worker behavior. Furthermore, the model features 816 can include other features 824. The other features 824 may relate to the worker, order, or other data that, when evaluated by the order-worker completion model 814, improves its accuracy in predicting a likelihood that a worker will complete an order if that order is assigned to the worker.

Additionally, in some examples, the work management platform 202 can determine what features are included in the model features 804 and 816. For example, the work management platform 202 can determine, for each of the models 802 and 814, a set of model features of a plurality of possible features. The work management platform 202 can determine the set of model features based on which features, when evaluated by the model, most improve the accuracy of the models. To do so, the work management platform 202, or a user of the work management platform 202, may use one or more of a number of feature-selection techniques for each model. For example, the work management platform 202 may analyze correlations between possible features and between features and the output; the work management platform 202 may use the models themselves to determine which features are most important; or the work management platform 202 or a user thereof may use a software program to determine which set of features is best for each model. In some examples, features may be added to the model features 804 and 816 until a certain number of features have been added. In some examples, features may be removed from the model features 804 and 816 until a certain number has been reached.

As can be appreciated, some features of the model features 804 and 816 may have a greater impact on the output of the models 802 and 814, respectively, than other features. For example, the model features 804 may include both (i) percentage of orders selected by a worker in the last hour and (ii) minutes until an order is late. However, one of the features may have a greater impact on the model output than the other. Furthermore, some features may increase the output value when they have a higher value, whereas others may decrease the output value when they have a higher value. How changes in a value for a feature impact the output value, and the extent of that impact, may be learned by the models 802 and 814 during training. Furthermore, the effect that each feature has on the output may be continuously updated as the models are exposed to more data.

Figure 9:
FIG. 9 is a flowchart of an example method useable by a work management platform.

FIG. 9 is a flowchart of an example method 900 usable by the work management platform 202. In some embodiments, the work management platform 202 may use the method 900 after sending one or more offers to one or more workers (e.g., step 412 of FIG. 4).

In the example shown, the work management platform 202 can receive a communication from a communicating worker (step 902). For example, the worker may be using an instance of a mobile application associated with the work management platform 202 on one of the mobile devices 204*a*-*x*. The worker may, for example, take an action that prompts the mobile application to send a communication to the work management platform 202. In some examples, the communication may relate to an offer that the work management platform 202 sent to the worker.

In the example shown, the work management platform 202 can determine whether an offer was selected (step 904). For example, the communication received by the work management platform 202 may be a notification and may include data indicating that the worker has accepted an offer. In some examples, when a worker selects an offer (e.g., from one of a plurality of offers), then the worker accepts that offer. On the other hand, the communication received by the work management platform 202 may be a notification and data indicating that the worker has not selected the offer. For example, the worker may have declined the offer. In some examples, the work management platform 202 may determine that a worker has not selected an offer without receiving a communication from the worker. For example, the offer may time out if the worker does not select the offer after a certain amount of time.

In the example shown, the work management platform 202 can, both when the offer is selected and not selected, update one or more of the order-worker selection model or order-worker data (step 906). For example, the work management platform 202 may use the following as an instance of training data to improve the order-worker selection model: (i) data related to the worker who sent the communication, (ii) data related to the order of the offer, and (iii) whether the order was selected or not selected. By updating the order-worker selection model by using additional training data, one or more parameters of the order-worker selection model may be altered. Furthermore, in some examples, the work management platform 202 may update data used to represent a state of orders, workers, and other information, an example of which is further described in connection with FIG. 10.

In the example shown, the work management platform 202, in response to determining that the offer is not selected by the worker (e.g., taking the "NO" branch from step 904 to step 908), can offer the order to another worker (step 908). To do so, the work management platform 202 may, in some embodiments, mark the order as an eligible order and include it in the plurality of eligible orders (e.g., repeating aspects of the method 400).

In the example shown, the work management platform 202, in response to determining that the offer is selected by the worker (e.g., taking the "YES" branch from step 904 to step 910), can assign the order to the worker. In some examples, by assigning the order to the worker, it will thereafter be the responsibility of the worker to complete the order. In some examples, the work management platform 202 may send a follow-up communication to the worker confirming that the order has been assigned to the worker. Furthermore, in some examples, the work management platform 202 may rescind the offer from other workers that the order may have been offered to.

In the example shown, the work management platform 202 may receive a second communication form the worker (step 912). For example, the second communication may relate to a status of the order assigned to the worker. Like the first communication, the second communication may be sent in response to the worker taking an action in the mobile application.

In the example shown, the work management platform 202 may determine whether the worker dropped the order (step 914). For example, the worker may have used an action of the mobile application to drop an order, and the second communication may include a dropped-order notification that notifies the work management platform 202 of that action.

In the example shown, the work management platform 202, in response to determining that the order was dropped (e.g., taking the "YES" branch from step 914 to 908), may remove the assignment of the order to the worker, and may offer the order to another worker (step 908), an action that is described above. For example, the work management platform 202 may add the dropped order to the plurality of eligible orders that are ready to be offered or assigned.

In the example shown, the work management platform 202, in response to determining that the order was not dropped (e.g., taking the "NO" branch from step 914 to 916), can determine whether the order was completed. For example, the second communication sent by the worker may state that the order was completed, or the work management platform 202 may otherwise determine based on information of the second communication whether the order was completed. However, the second communication may indicate that something happened to the worker or the order that renders the order as not completed, or as unable to be completed.

In the example shown, the work management platform 202 can, whether the offer is dropped, not dropped, completed, or not completed, update one or more of the order-worker completion model or order-worker data (step 918). For example, the work management platform 202 may use the following as an instance of training data to improve the order-worker completion model: (i) data related to the worker who sent the second communication, (ii) data related to the order related to the second communication, and (iii) whether the order was dropped or completed. By updating the order-worker completion model by using additional training data, one or more parameters of the order-worker completion model may be altered. Furthermore, in some examples, the work management platform 202 may update data used to represent a state of orders, workers, or other information, an example of which is further described in connection with FIG. 10.

In the example shown, the work management platform 202, in response to determining that the order was not completed (e.g., taking the "NO" branch from step 916 to step 908), can offer the order to another worker, an action that is described above. In the example shown, the method 900 may end (step 920) in response to the work management platform 202 determining that the order is completed.

Figure 10:
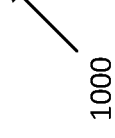
FIG. 10 illustrates example status data.

FIG. 10 illustrates example status data 1000. The work management platform 202 may maintain the status data 1000 in an internal or external database, or the data of the status data 1000 may be spread out across various databases. The example status data 1000 includes information related to orders, workers, offers, status updates, and times. In other embodiments, the example status data 1000 may include different data.

As shown, each order may have a unique identifier. Each of the orders may be one of a plurality of eligible orders of a particular area. The orders may also include orders that have already been completed, orders that have recently been created, or orders that are not yet eligible. As shown, an order may be associated with more than one entry in the status data 1000 (e.g., orders "C" and "E") if, for example, the order has been offered to more than one worker of if for another reason the order requires multiple entries.

Like the orders, each worker may also have a unique identifier. The workers may be workers that are available and that work in a particular area. The workers may also include workers that are scheduled to be available or all workers that are registered for a particular area. As shown, some workers may be associated with one or more orders, while others (e.g., worker "003") may be available, but not associated with any order.

In the example of FIG. 10, the offers may correspond to a matching of an order with a worker, and the work management platform 202 may generate, transmit, and track offers as part of performing, for example, the methods 400 and 900, as described above. Each offer may be assigned a unique identifier. In some examples, as described above, if a worker selects or accepts an offer, then the worker may be assigned to the offered order. Otherwise, the offer may be pending or be declined by the worker. Each row of the status data 1000 may have a different status, and the work management platform 202 may track the statuses of orders, workers, and offers. As part of doing so, the work management platform 202 may receive, generate, or store a series of updates. In the example status data 1000, a most recent update for each row is shown. However, the work management platform 202 may track more than just the most recent update for an order, worker, or offer.

Each update may have an associated time or datetime, and relate to one or more of the order, worker, or offer of the same row. For example, "Order Completed" may indicate that the worker completed the order; "Order Begun" may indicate that the worker has started work on the order (e.g., has arrived a start location of an order, or the time has arrived for the order to begin); "Order Changed" may indicate that one or more characteristics of the order has changed (e.g., there was a route change, time change, or other change of the order); "Order Distressed" may indicate that the order is close to a deadline, a status that may cause, in some embodiments, the work management platform 202 to offer the order to more workers, increase pay for the order, or take other action; "Order Selected" may indicate that the worker selected or accepted the offered order, thereby causing, in some examples, the work management platform 202 to assign the worker to the order; "Offer Made" may indicate that the order was offered to the worker; "Order Eligible" may indicate that the order is now eligible to be offered to one or more workers (e.g., because the order was created, because the order is sufficiently close to a deadline, or because of another change); "Order Dropped" may indicate that a worker, who had been assigned to the order, dropped the order; "Eligibility Change" may indicate a change to a characteristic or eligibility of an order; "Offer Expired" may indicate that the worker did not select the offered order within a certain time, and thereafter, the worker may not be able to select the order; "Offer Declined" may indicate that the worker declined the offer; and "Worker Online" may indicate that the worker is now available or online. Additionally, the work management platform 202 may track other statuses and updates than those described in the example, including, for example, when an order is late, when a worker eligibility or status changes, or other statuses or updates related to orders, workers, or offers.

Figure 11:
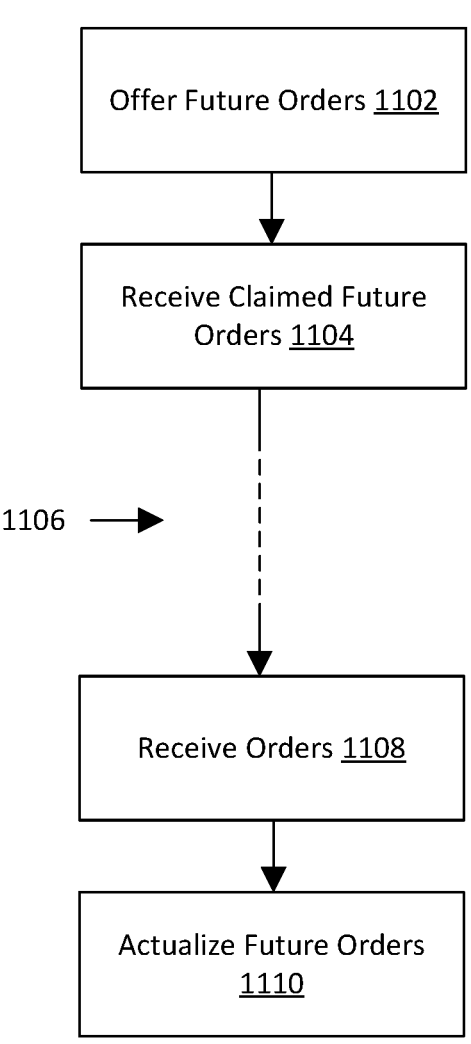
FIG. 11 is a flowchart of an example method useable by a work management platform.

FIG. 11 is a flowchart of an example method 1100 usable by the work management platform 202.

In the example shown, the work management platform 202 can offer future orders (step 1102). In some embodiments, a future order is a placeholder for an actual order that has not yet been received by the work management platform 202, or that is not yet ready to be assigned to a worker. For example, the work management platform 202—or another system or program in communication with the work management platform 202—may forecast or project future work. In some embodiments, the work may be orders, such as pickups, deliveries, delivery routes, or shopping orders. The future orders may include a projection of an order to take place on a later date, such as a certain number of days later (e.g., one, two, or three days). In some embodiments, each of the future orders may not include all the detail of eligible orders or orders that are currently ready to be fulfilled. For example, the future orders may only include some information, some of which may be estimated. For example, a future order may include one or more of an estimated pay, duration, location, or time. In some examples, two or more future orders may include the same information.

The work management platform 202 may offer future orders to a plurality of workers. In some embodiments, the workers may be drivers; in other embodiments, the plurality of workers may include other types of workers. The workers who are offered the future orders may be, for example, workers who perform the type of work of the order, workers who work in a particular area, or workers who are projected to be available at the appropriate time. In some examples, some future orders may be offered to some workers, while other future orders may be offered to other workers. In some examples, the work management platform 202 may offer future orders to workers by sending information to one of the mobile devices 204a-x associated with the worker, an example of which is further described in connection with FIG. 16.

In the example shown, the work management platform 202 may receive claimed future orders (step 1104). For example, the work management platform 202 may receive a communication from a mobile device of a worker who was offered a future order, and the communication may indicate that the worker has claimed the future order. In response to receiving claimed future orders, the work management platform 202 can, in some embodiments, store data indicating what workers claimed which orders, including data related to the claiming worker and claimed order. In some embodiments, the work management platform 202 can repeatedly offer future orders and receive claimed future orders (e.g., repeating steps 1102 and 1104) until all, or a certain number, of future order have been claimed, or until a certain time is reached.

In the example shown, the work management platform 202 can offer future orders and receive claimed future orders (steps 1102 and 1104) a certain amount of time before receiving orders and actualizing future orders (steps 1108 and 1110), as illustrated by the time elapse 1106 (e.g., a dashed line); in other embodiments, the time elapse 1106 may occur after receiving orders (step 1108) but before actualizing future orders (step 1110). In some examples, the time elapse 1106 represents two, four, eight, twelve hours, or another number of hours or minutes; in other examples, the time elapse 1106 may represent a date change (e.g., moving from one day to the next). In some examples, the time elapse 1106 may be defined by a user or administrator of the work management platform 202, or the time elapse 1106 may change depending on when future orders are offered and claimed, or when orders are received or actualized.

In the example shown, the work management platform 202 may receive orders (step 1108). For example, the orders may be actual orders, as opposed to future orders. For example, the orders may have more detail (such as the orders described above), the orders may be eligible orders, or the orders may be ready to be offered and assigned to workers. In some embodiments, the work management platform 202 may receive the orders from an external system or program, such as from the same organization that generated the future orders. In some embodiments, the work management platform 202 itself may generate the orders.

In some examples, the orders (e.g., received at step 1108) may correspond to the future orders. For instance, each of the orders may correspond to a future order, the difference between them being that the order has more detail than the future order, and the order may have more actual information instead of estimated information. For example, whereas the future order may have an estimated pay, estimated duration, or estimated location, the actual order corresponding to that future order may have a pay, duration, location, or other information. Furthermore, the order may have one or more of the characteristics described above. In other examples, there may not be a one-to-one correspondence between the orders and the future orders. For example, there may be more or less orders than future orders, or there may be some orders that do not correspond to a future order but were nevertheless generated or received by the work management platform 202.

In the example shown, the work management platform 202 may actualize future orders (step 1110). For example, the work management platform 202 may assign the orders to the workers who claimed future orders. By doing so, the work management platform 202 may actualize the claimed future orders by replacing the relatively bare, perhaps estimated data of the future orders with details of orders that are ready to be assigned. Example aspects of actualizing future orders is further described below in connection with FIG. 12. In some embodiments, the work management platform 202 may perform one or more aspects of the method 1100 at the same time. For example, the work management platform 202 may, for one set of orders, be offering and receiving claims for future orders associated with those orders, while also, for a different set of orders, be receiving those actual orders or using them to actualize future orders. Furthermore, having actualized future orders, the work management platform 202 may continue to track those orders, workers, and other data, as well as take actions in response to status changes of orders and workers, as described above and as is further described below in connection with FIG. 15.

Figure 12:
FIG. 12 is a flowchart of an example method for actualizing future orders.
Figure 12:
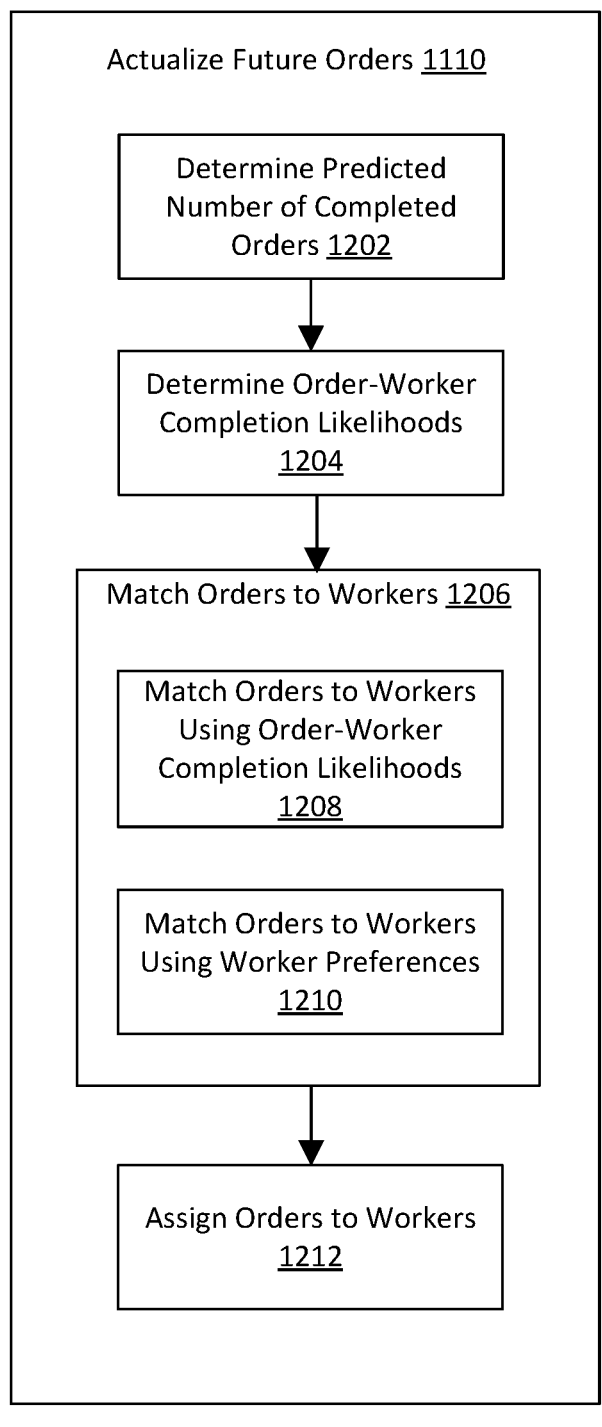

FIG. 12 is a flowchart of an example method 1200 useable by the work management platform 202. In some examples, the work management platform 202 may use one or more aspects of the method 1200 to perform at least part of actualizing future orders (e.g., step 1110 of the method 1100). A schematic example illustrating aspects of the method 1200 is described below in connection with FIG. 13.

In the example shown, the work management platform 202 may determine predicted number of orders to be completed (step 1202). For example, as described above, the work management platform 202 can track which workers claimed future orders. Each of those workers may have claimed one or more future orders. For each of those workers, the work management platform 202 may determine a predicted number of orders that the worker is actually going to complete. For example, although a worker may have claimed three orders, the work management platform 202 may determine (e.g., based on past worker behavior and other factors) that it is more likely that the worker only completes two orders and, if assigned, would more likely drop a third order than complete it. To determine a predicted number of completed orders, the work management platform may use a model implementing machine learning techniques, as is further described below in connection with FIG. 14A.

In the example shown, the work management platform 202 may determine order-worker completion likelihoods (step 1204). For example, the work management platform 202 may determine, for each order-worker pair, the likelihood that the worker would complete the order if assigned. In other words, the work management platform 202, for each order (e.g., an order received or generated at step 1108 of method 1100, or actual order as opposed to future order), may determine, for each worker (e.g., each worker that claimed at least one future order), the likelihood that the worker would complete the order if assigned to that order. As a result, the work management platform 1108 may generate a matrix of order-worker scores corresponding to order-worker pairs, each score representing a likelihood that the worker would complete the order if assigned. In some embodiments, determining the order-worker completion likelihoods (e.g., step 1204 of the method 1200) may use similar processes described above in connection with step 704 of the method 700, and vice-versa. To determine the order-worker completion likelihoods, the work management platform 202 may use a model using machine learning techniques, as is further described below in connection with FIG. 14B.

In the example shown, the work management platform 202 may match orders to workers (step 1206). For example, the work management platform 202 may match actual orders to the workers who claimed future orders. To do so, the work management platform 202 may use a variety of techniques or combination of techniques, such as matching orders and workers based on the order-worker completion likelihoods or matching based on worker preferences. In other embodiments, however, the work-management platform 202 may use other techniques to match orders to workers.

In the example shown, the work-management platform 202 may match orders to workers by using the order-worker completion likelihoods (step 1208). For example, as described above, the work management platform 202 may have a matrix of scores representing order-worker completion likelihoods. As part of matching the orders to workers, the work management platform 202 may, in some embodiments, match an order with exactly one of the workers. To do so, the work management platform 202 may use or more techniques for solving combinatorial optimization problems, thereby optimizing a metric while accounting for one or more constraints. For example, when matching, the work-management platform 202 may account for the effect that a match between an order and a worker may have on other possible combinations of orders and workers. In some embodiments, the work-management platform 202 may seek to optimize the likely number of orders that will be completed while accounting for constraints, such as constraints related to the workers, orders, or other circumstances. In some embodiments, the work management platform 202, as part of matching orders to workers using order-worker likelihoods (e.g., step 1208 of method 1200), may use one or more aspects described above in connection with matching orders to workers (e.g., step 410 of FIG. 4).

In some examples, the work-management platform 202, as part of matching orders to workers using order-worker completion likelihoods (e.g., step 1208), may match each worker with a certain number of orders. For example, the work-management platform 202 may assign a worker up to the number of orders that the worker is predicted to complete (e.g., as predicted at step 1202). For example, a worker may have claimed three future orders, but the work management platform 202 may determine that the worker is more likely to complete only two orders. Thus, in some embodiments, the work management platform 202 may assign that work two orders, or up to two orders, based on the order-worker completion likelihoods, and the work management platform 202 may use other techniques for matching that worker with other orders, as described below.

In the example shown, the work management platform 202 may match orders to workers using worker preferences (step 1210). For example, one or more of the workers may have one or more preferences. In some embodiments, workers may enter preferences into a user interface of a mobile application associated with the work management platform 202, and transmit those preferences to the work management platform 202. The work management platform 202 may receive those preferences and store them as linked to that worker. In some embodiments, the preferences may relate to any one or more of a location, time, duration (e.g., how long an order takes to fulfill), order type, organization associated with an order, or other characteristic of an order.

The work management platform 202 may use these preferences to match orders and workers. For example, the work management platform 202 may determine an order-worker preferences score for an order and a worker. To determine the order-worker preference score, the work management platform 202 may, in some examples, determine a location match score and a duration match score, which may be combined to determine the preference score. The preference score may correspond with how well the order aligns with the workers preferences. For example, if the order has a location and duration that are the same, or similar to, a worker's preferred order location and duration, then the order-worker preference score for that pair may be relatively high; conversely, if the order characteristics and the worker's preferences do not align well, then the order-worker preference score may be relatively low. In some examples, the work management platform 202 may determine an order-worker preference score for each order (or each order that has not yet been matched) and for each worker (or for each worker that can still be assigned an additional worker).

In some embodiments, the work management platform 202 can match orders to workers using worker preferences (step 1210) after having matched orders to workers using order-worker completion likelihoods (step 1208). As described above, the work management platform 202, in some examples, may assign orders to workers using order-worker completion likelihoods up to the number that the worker is predicted to complete. In some cases, however, (e.g., if the worker claimed more orders than that number), then the work management platform 202 may assign the worker additional orders. To do so, the work management platform 202 may use worker preferences and order-worker preference scores. Continuing with the example form above, a worker may have claimed three future orders, but is only predicted to complete two orders. The work-management platform 202 may assign that worker two orders using order-worker completion likelihoods, and then assign that worker an additional order (thereby assigning the worker three orders, equal to the number of claimed orders) based on that worker's preferences. In other embodiments, the work management platform 202 may first use worker preferences and then use order-worker completion likelihoods, and in other embodiments, the work management platform 202 may use other techniques to match orders and workers.

In the example shown, the work management platform 202 may assign orders to workers (step 1212). For example, the work management platform 202 may assign each order to the worker that the order was matched to. When assigning an order to a worker, it may thereafter be the worker's responsibility to complete the order, unlike when offering the order to the worker, which may give the worker the option to select the order. Additionally, the work management platform 202 may transmit information to workers about their one or more assigned orders, using for example the mobile application associated with the work management platform 202 and the mobile devices 204a-x, an example of which is further described below in connection with FIGS. 15 and 17.

Figure 13:
FIG. 13 illustrates a schematic diagram of an example application of aspects of the present disclosure.
Figure 13:
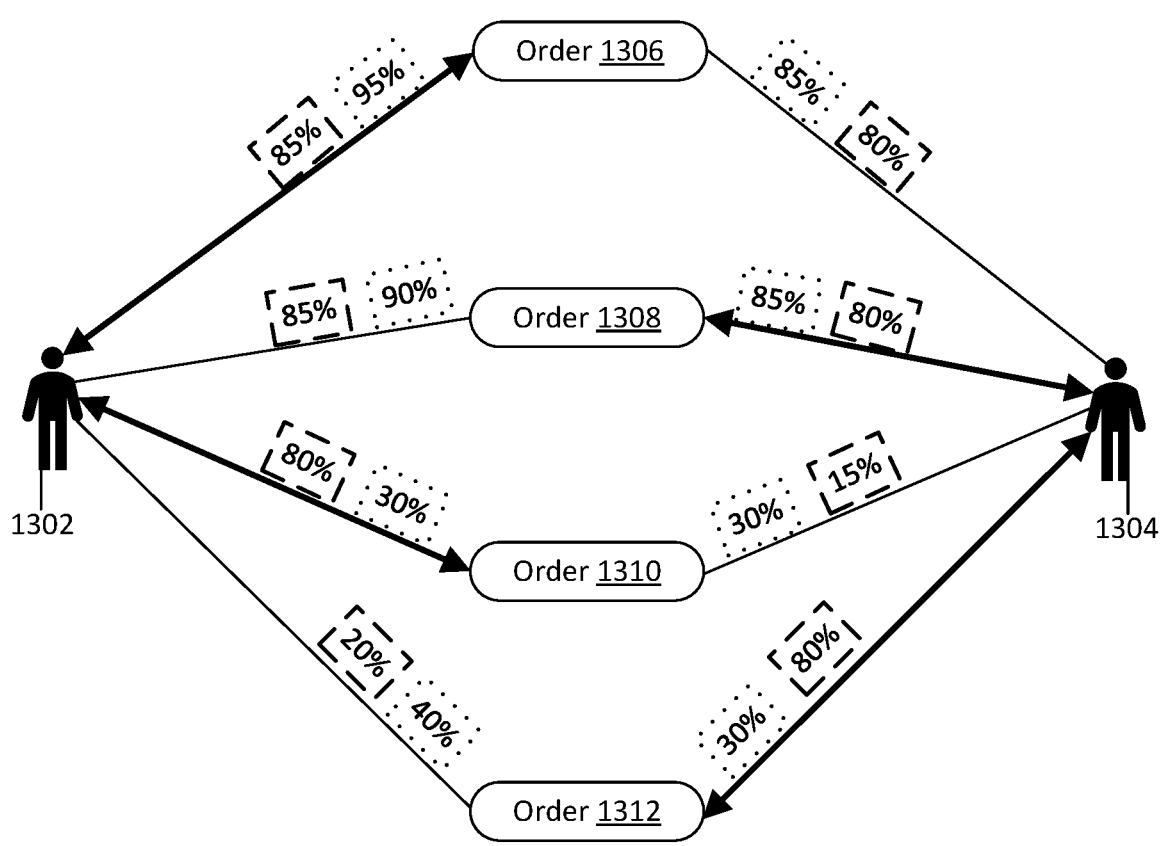

FIG. 13 illustrates a schematic example 1300 of aspects of the present disclosure. For example, the example 1300 illustrates aspects of actualizing future orders, a process that is described above in connection with FIGS. 11 and 12. The example 1300 includes workers 1302-1304 and orders 1306-1312. Additionally, the example 1300 includes a plurality of order-worker completion likelihoods 1314 (as denoted by the dotted-line boxes) and a plurality of order-worker preference scores 1316 (as denoted by the dashed-line boxed). In the example 1300, there is an order-worker completion likelihood and an order-worker preference score for each order-worker pair. For example, the order-worker completion likelihood is 95% for the worker 1302 and the order 1306, indicating that, in some examples, the probability that the worker 1302 would complete the order 1306 if assigned is 95%. Continuing with the example, the order-worker preference score is 85% for the worker 1302 and the order 1306, indicating that, in some examples, the worker's preferences are 85% in alignment with characteristics of the order 1306. In other examples, one or more of the order-worker likelihoods or the order-worker preference scores may be values other than percentages.

In the example 1300, each of the workers 1302-1304 may have claimed one or more future orders. For example, each of the workers 1302-1304 may have claimed two future orders. The orders 1306-1312 may be actual orders, and the work management platform 202 may actualize the future orders claimed by the workers 1302-1304 using the orders 1306-1312. To do so, the work-management platform 202 may have determined the illustrated order-worker completion likelihoods 1314 and the order-worker preference scores 1316, as described above in connection with FIG. 12 and below in connection with FIG. 14. Furthermore, the work management platform 202 may determine a predicted number of completed orders for each of the workers 1302-1304, as described above in connection with FIG. 12 and below in connection with FIG. 14. For example, although each of the workers 1302-1304 claimed two future orders, the work management platform 202 may predict that it is more likely that each of them completes one order.

In the example 1300, the work management platform 202 can match each of the orders 1306-1312 to one of the workers 1302-1304, a process further described above in connection with FIG. 12. In one embodiment, the work management platform 202 may use the order-worker completion likelihoods to assign workers as many orders as they are likely to do. For example, the work management platform 202 may determine to assign each of the workers 1302-1304 one order of the orders 1306-1312 using the order-worker completion likelihoods. For example, based on the order-worker completion likelihoods, the work management platform 202 may match the order 1306 with the worker 1302 and the order 1308 with the worker 1304 (as indicated by arrows and bolded lines). Additionally, in some embodiments, the work management platform 202 may match additional orders to workers based on order-worker preference scores 1316. For example, the work management platform 202 may match the order 1310 with the worker 1302 and the order 1312 with the worker 1304 (as indicated by arrows and bolded lines). In some embodiments, the work management platform 202 may then assign the orders 1306 and 1310 to the worker 1302 and the orders 1308 and 1312 to the worker 1304. The work management platform 202 may also send information to the workers 1302-1304 about their assigned orders.

As can be appreciated in the example 1300, the work management platform 202, by accounting for both order-worker completion likelihoods and for order-worker preference scores, may make matches that are more likely to be completed. For example, by using the order-worker completion likelihoods, the work management platform 202 may leverage past worker behavior data and order characteristics. Because past behavior may be a good indication of future behavior, and because of the amount of data that the order-worker selection model may train on, the order-worker completion likelihoods may be accurate predictions of whether a worker will complete an order. At the same time, however, the work management platform 202 may directly considers workers' preferences, which may change, and which may not be adequately captured in all cases by past worker behavior. By considering worker preferences, the work management platform 202 may match workers with orders that the workers state that they prefer. For example, in the example 1300, each of the workers 1302-1304 are matched with work that they are likely to complete based on their past behavior or that align well with their stated preferences. Thus, worker satisfaction may improve, more orders may be completed, the number of dropped orders may be reduced, and overall work efficiency may be improved.

Figure 14A:
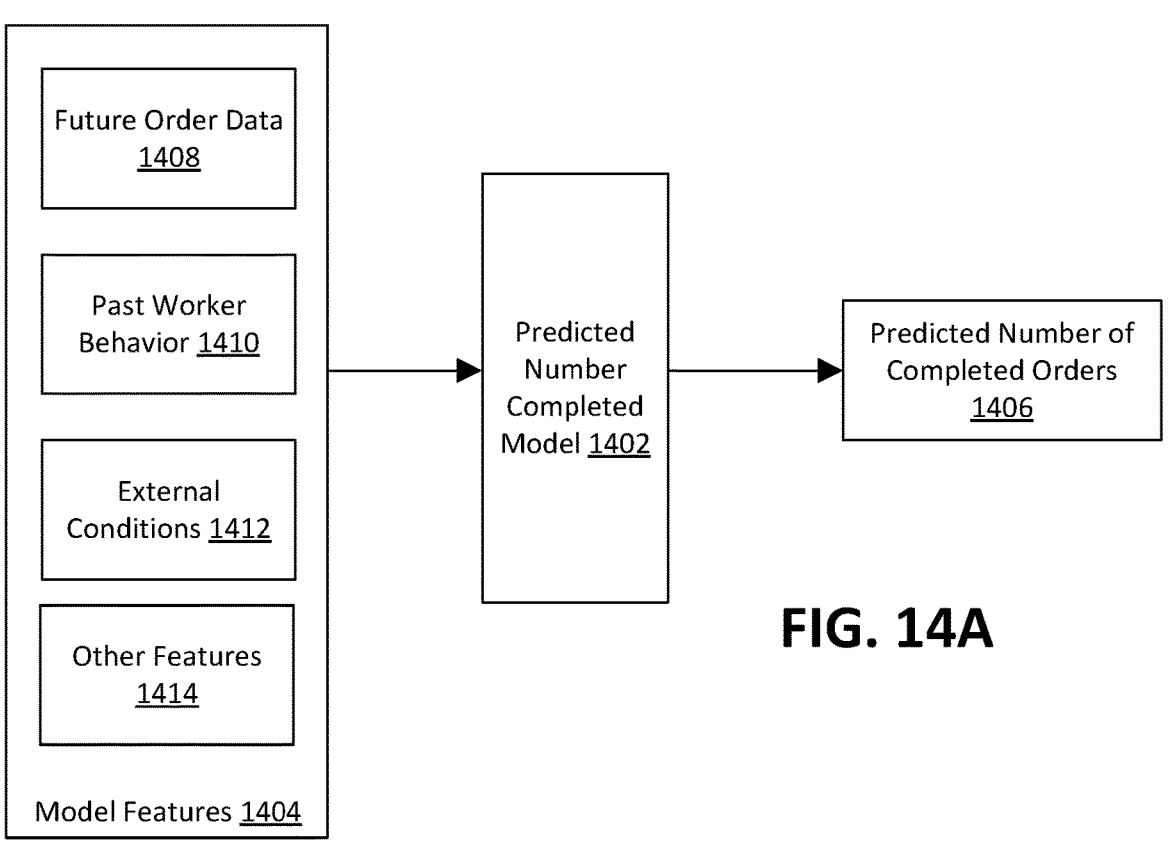
FIG. 14A illustrates a block diagram of a model for predicting a number of completed orders.

FIG. 14A illustrates a block diagram of a model for predicting a number of orders that a worker will complete. FIG. 14A includes a predicted number completed model 1402, model features 1404, and a predicted number of completed orders 1406. The model features 1404 may include a plurality of features, including future order data 1408, past worker behavior 1410, external features 1412, and order features 1414.

Figure 14B:
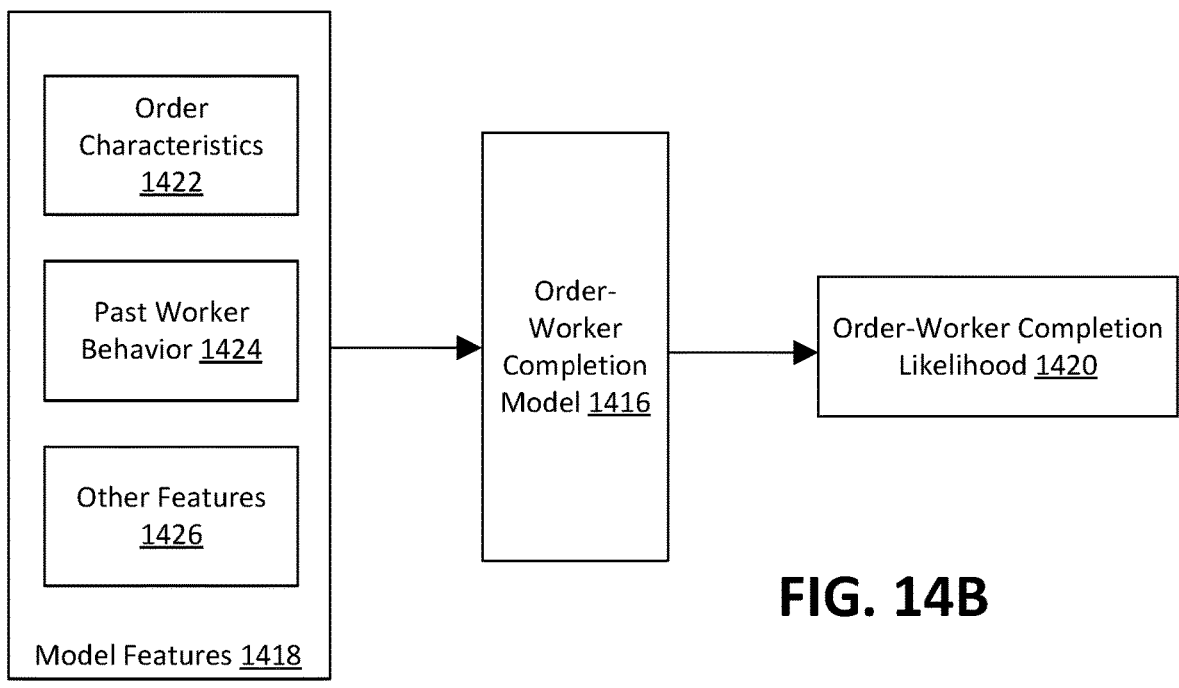
FIG. 14B illustrates a block diagram of a model for determining an order-worker completion likelihood.

FIG. 14B illustrates a block diagram of a model for determining a likelihood that a worker will complete an order if assigned to that order. FIG. 14B includes an order-worker completion model 1416, model features 1418, and an order-worker completion likelihood 1420. The model features 1418 may include a plurality of features, including order characteristics 1422, past worker behavior 1424, and other features 1426. In some embodiments, the order-worker completion model 1416 is the same or similar to the order-worker completion model 814 of FIG. 8B; in other embodiments, the models may be different.

The predicted number completed model 1402 and the order-worker completion model 1416 can be models that implement machine learning techniques to perform regression tasks. For example, once trained, the predicted number completed model 1402 may receive, as an input, values (e.g., numbers) for each of one or more of the model features 1404. Based on these values, the predicted number completed model 1402 may output a predicted number of completed orders for a worker. As to the order-worker completion model 1416, it can receive, as an input, values (e.g., numbers) for each of one or more of the model features 1418. Based on these values, the order-worker completion model 1416 may output a probability that a worker will complete an order, assuming that the worker is assigned to that order.

As described above in connection with FIGS. 8A-8B, the work management platform 202 may train the models 1402 and 1416. As training data, the models 1402 and 1416 may use past data that correspond to the model features 1404 and 1418, respectively. For example, the model 1402 may train using past future order data (e.g., future orders that were claimed and actualized in the past), past worker behavior data, past external condition data, and other past data. Furthermore, the model 1416 may train using order characteristics of past order data, past worker behavior data (aspects of which may be different than the past worker behavior data to train the model 1402), and other past data. In some examples, the training can be supervised, a process described above in connection with FIGS. 8A-8B. In some examples, the models 1402, 1416 may use logistic regression, support-vector machines (SVMs), deep learning, neural networks, gradient boosting, decision trees, random forests, or other techniques related to regression tasks or machine learning. In some embodiments, one or more of the models 1402 or 1416 may use eXtreme Gradient Boosting (XGBoost). In some embodiments, one or more of the models 1402 and 1416 may use Light Gradient-Boosting Machine (LightGBM).

The model features 1404 can, in some examples, include future order data 1408, past worker behavior 1410, external features 1412, and order features 1414. The features related to future order data 1408 may include the number of future orders that the worker claimed, when those future orders were claimed, details of those future orders, the total number of future orders in a set of future orders, or other information related to future orders, either those claimed by a particular order or future orders in general. In some embodiments, by considering future order data, the predicted number completed model 1402 may more accurately predict how many orders a worker will actually complete. For example, the best indicator of how many orders a worker will complete may be the number of future orders that the worker claimed.

The past worker behavior 1410 can include features related to past behavior of a worker. For example, the features for past worker behavior 1410 may include the following: the average number of orders fulfilled by the worker on days worked by the worker; the average number of completed orders per day, week, or other time period; the number of recently performed orders; the drop percentage of assigned orders; or other features related to past worker behavior. Furthermore, there can be features that may involve data from both a worker and the future orders claimed by the worker, such as one or more features related to the similarity between characteristics of the future orders and orders previously fulfilled by the worker.

The features related to external conditions 1412 may include features other than those related to past worker behavior or characteristics of claimed future orders. For example, the external conditions can include features related to the weather, such as temperature, feels-like temperature, precipitation, wind, cloud cover, visibility, humidity, or other weather conditions. One or more of the weather-related features may be converted to a numeric value so as to serve as an input to the predicted number completed model 1402. Furthermore, the external conditions may include the day of the week, month, or year, which also may be converted into a numeric value. Additionally, other features related to external conditions and other features 1414 that may be helpful for determining how many orders a worker will complete may also be included in the model features 1404.

In some embodiments, at least some of the model features 1418 may overlap with the model features 816 of FIG. 8. In some embodiments, however, even if there is overlap in the model features 1418 and the model features 816, the features may be weighed differently by the order-worker completion model 1416 and the order-worker completion model 814, respectively.

The order characteristics 1422 can be features that relate to characteristics of a particular order. For example, the order characteristics 1422 may include the following: pay; duration; distance from a pickup to a drop-off; type; number of stops; one or more locations associated with the order (e.g., origin or destination locations); a zone; an organization associated with an order (e.g., a particular store); characteristics of one or more locations associated with the order (e.g., characteristics of one or more pickup locations or one or more drop-off locations); one or more distance metrics related to the order; the similarity of the order to other orders; whether the order belongs to a group of other orders; or other characteristics or data related to the order.

The features related to the past worker behavior 1424 may relate to past behavior of a particular worker. For example, the features for past worker behavior 1424 may include the following: drop ratio (e.g., the number of orders dropped by a worker compared to the number of orders assigned or completed) in the last year, month, twenty-one days, week, or other amount of time; number of drops; completion ratio; number of completed orders; number of orders assigned to the worker; or number of orders offered to the worker. Furthermore, there can be features that may use data from both an order and a worker, such as the following: a distance between one or more locations of the order to a location associated with the worker; a similarity of a location of the order to a location of an order that the worker previously completed; a similarity of a time of the order to a time of an order that the worker previously completed; a similarity of the type of the order to the type of an order that the worker previously completed; or other features that relate to both characteristics of the order and to past worker behavior. Furthermore, the model features 1418 can include other features 1426. The other features 1426 may relate to the worker, order, or other data that, when evaluated by the order-worker completion model 1416, improves its accuracy in predicting a likelihood that a worker will complete an order if that order is assigned to the worker.

Additionally, in some examples, the work management platform 202 can determine what features are included in the model features 1404 and 1418. For example, the work management platform 202 can determine, for each of the models 1402 and 1416, a set of model features of a plurality of possible features. The work management platform 202 can determine the set of model features based on which features, when evaluated by the model, most improve the accuracy of the models. To do so, the work management platform 202, or a user of the work management platform 202, may use one or more of a number of feature selection techniques for each model. For example, the work management platform 202 may analyze correlations between possible features and between features and the output values; the work management platform 202 may use the models themselves to determine which features are most important; or the work management platform 202, or a user thereof, may use a software program to determine which set of features is best for each model. In some examples, features may be added to the model features 1404 and 1418 until a certain number of features have been added. In some examples, features may be removed from the model features 1404 and 1418 until a certain number has been reached.

As can be appreciated, some features of the model features 1404 and 1418 may have a greater impact on the output of the models 1402 and 1416, respectively, than other features. For example, the model features 1404 may include both (i) a number of future orders claimed and (ii) how sunny it is outside. One of these features may have a greater impact on the model than the other. Furthermore, some features may increase the output value when they have a higher value, whereas others may decrease the output value when they have a higher value. How changes in a value for a feature impact the output value, and the extent of that impact, may be learned by the models 1402 and 1416 during training, and the models may be continuously updated as the models are exposed to more data.

Figure 15:
FIG. 15 is a flowchart of an example method useable by a work management platform.

FIG. 15 is a flowchart of an example method 1500 usable by the work management platform 202. In some examples, the work management platform 202 may use aspects of the method 1500 after having assigned orders to workers (e.g., after having perform aspects of the method 1100 and the method 1200).

In the example shown, the work management platform 202 may transmit order details to a worker (step 1502). In some embodiments, the work management platform 202 may transmit order details to the workers for each of the orders assigned to the workers. In some examples, the work management platform 202 may push order details to the mobile devices of the workers.

For example, the worker may have claimed future orders at an earlier time, and the work management platform 202, having actualized those orders, may send more detailed information related to those actualized orders, including information that is no longer an estimate. For example, the order details may include a pay, an order type, one or more locations (e.g., addresses of origin or destination locations), duration, one or more times, a number of packages, a distance of a route, or other information related to the order. The order details may also indicate that the worker has been assigned to the order. In some examples, the work management platform 202 can send actualized order details to workers on the morning that the orders are to be fulfilled, but before the workers begin working the orders. Thus, workers may have an opportunity to view details of their assigned orders (and have the ability to drop or possibly change them) before they actually begin working those orders.

In the example shown, the work management platform 202 may receive a communication from a communicating worker (step 1504). For example, a worker may take an action in the mobile application, and the mobile application may send information related to that action to the work management platform 202. One type of communication may indicate that a worker dropped an order. For example, when a worker receives order details for one or more actualized orders, the worker may elect not to work one of those orders and therefore decide to drop it. Another type of communication may indicate that the worker has started working an order, and another type of communication may indicate that the worker has completed an order. The mobile application may send, in some embodiments, such information in response to determining the worker's location or in response to an input of the worker.

In the example shown, the work management platform 202 may determine whether an order was dropped (step 1506). For example, the work management platform 202 may determine, based on the communication from the worker, whether the order was dropped.

In response to determining that the order was dropped (e.g., taking the "YES" branch from step 1506 to step 1508), the work management platform 202 may offer the order to another worker (step 1508). To do so, the work management platform 202 may use aspects of the method 400 described above in connection with FIG. 4. Additionally, one example of offering work to another order is described above in connection with step 908 of FIG. 9. In other embodiments, however, the work management platform 202 may offer work to another worker in a different way, such as by narrowing the pool of potential workers to offer the order to, for example either by narrowing it to only workers who claimed a future order, or by narrowing it to workers who did not claim a future route.

In response to determining that the order was not dropped (e.g., taking the "NO" branch from step 1506 to step 1510), the work management platform 202 may determine whether the order was completed (step 1510). For example, the work management platform 202 may determine whether an order was completed based on the communication received form the worker.

For example, the worker may indicate that, for whatever reason, the order was unable to be fulfilled, or the work management platform 202 may infer that the work is not able to be completed based on the communication. If so, the work management platform 202, in some examples, may offer the order to another worker (e.g., taking the "NO" branch from step 1510 to step 1508), or the work management platform 202 may take other action (e.g., notifying a user or other system that there is an issue or change with the order or the worker). In response to determining that the order was completed (e.g., taking the "YES" branch from step 1510 to step 1514), the work management platform 202 may end the method 1500.

In the example shown, the work management platform 202 can update one or more of the predicted number completed model 1402, the order-worker completion model 1416, or order-worker data (step 1512). In some examples, the work management platform 202 may update one or more of the models or the order-worker data regardless of whether the order was dropped, not dropped, completed, or not completed. For example, the work management platform 202 may use data from the worker who sent the communication and data from the received communication to update one or more of the models or data. In some embodiments, this data may serve as a training instance for one or more of the models. In some embodiments, by updating one or more of the models, internal parameters of the one or more models may be altered. For example, based on a plurality of communications from a worker over a certain time (e.g., a day), the work management platform 202 may determine how many orders the worker actually fulfilled on a given day and use that data to improve the accuracy of the predicted number completed model. Likewise, the work management platform 202 may receive data indicating whether a worker actually fulfilled a particular order assigned to that worker; using that data, the work management platform may improve the accuracy of the order-worker completion model 1416. Furthermore, the work management platform 202 may track data related to orders and workers, an example of which is described above in connection with FIG. 10. In some embodiments, the work management platform 202 may update this data in response to receiving a communication from a worker.

Figure 16:
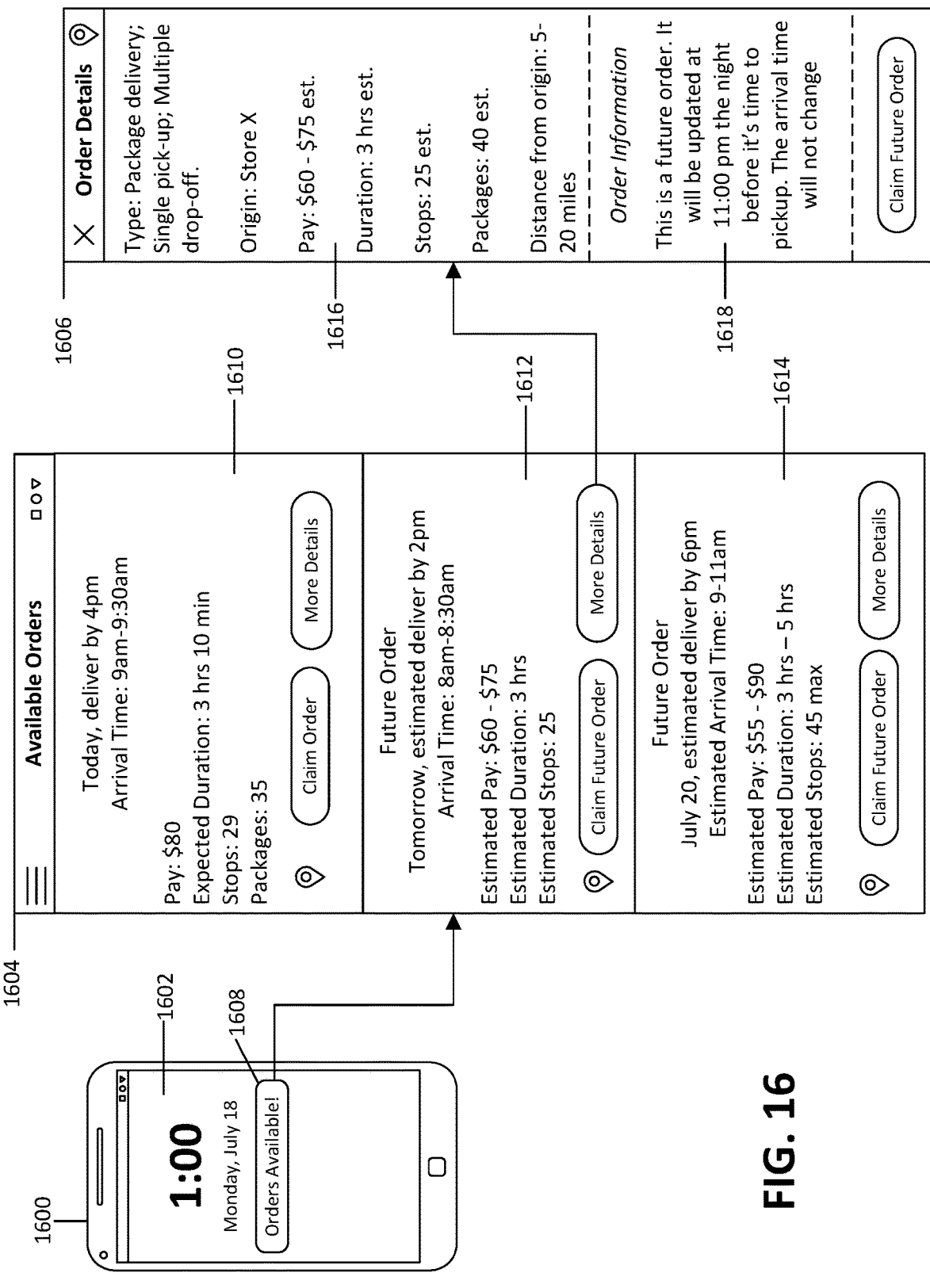
FIG. 16 illustrates example user interfaces for viewing orders.

FIG. 16 illustrates example user interfaces for viewing orders. FIG. 16 includes a mobile device 1600, which may be communicatively coupled to the work management platform 202. The mobile device 1600 may have an application installed that is associated with the work management platform 202. Or the mobile device 1600 may communicate with the work management platform 202 via other means (e.g., via a web browser). The mobile device 1600 may be associated with a worker, and the mobile device 1600 may be one of the mobile devices 204a-x.

In the example shown, the mobile device 1600 includes a home user interface 1602, an available orders user interface 1604, and an order details user interface 1606. The home user interface 1602 may be an initial user interface of the mobile device 1600 that a user first sees when using the mobile device 1600. In the example shown the home user interface 1602 includes a date and time, and an orders available notification 1608. The orders available notification may be a push notification associated with the mobile application that is associated with the work management platform 202. In some embodiments, the work management platform 202 may push the orders available notification to the mobile device 1600 as part of offering an order or future order to the worker associated with the mobile device 1600. In some examples, a user may select the orders available notification 1608, thereby activating the mobile application and displaying the available orders user interface 1604.

In some embodiments, the available orders user interface 1604 may display one or more available orders, such as the available orders 1610-1614. As shown, some of the available orders 1610-1614 may be eligible orders, such as the order 1610, which is scheduled to be fulfilled today, and which may be ready to assign to a worker who selects it. Additionally, some of the available orders 1610-1614 may be future orders, such as the future orders 1612-14. As described above, a user may claim the future orders 1612-1614, but in some examples, the work management platform 202 may wait to assign those orders and fill in more details for those orders until they have been actualized, a process described above in connection with FIGS. 11-12. As shown, the available orders user interface 1604 may display details related to the available order 1610-1614. In some embodiments, the details for each order may differ, and for future orders, some of the details may be estimates (e.g., estimated times, pay, duration, and stops), and the future orders may have less detail than other orders. Additionally, the user interface 1604 may include location data, or a link to location data, for each of the orders, and the user interface 1604 may include options for a user to claim an order or to view more order details. In response to a user input (e.g., a click, or pressure on a touch screen) corresponding to a selection of "More Details," the mobile application may display the order details user interface 1606 for the future order 1612.

The order details user interface 1606 may include order details 1616 and other order information 1618. The order details 1616 may include more information related to the future order 1612, such as the type of order (e.g., package delivery, shopping order, taxi service, or other type of order), locations related to the order, and other characteristics of the order, some of which may be estimates. The order information 1618 may include other information related to the order 1612, such as information related to the order's status. In the case of a future order, the information may state when the order will be actualized or updated, and whether one or more or characteristics will or will not change.

Figure 17:
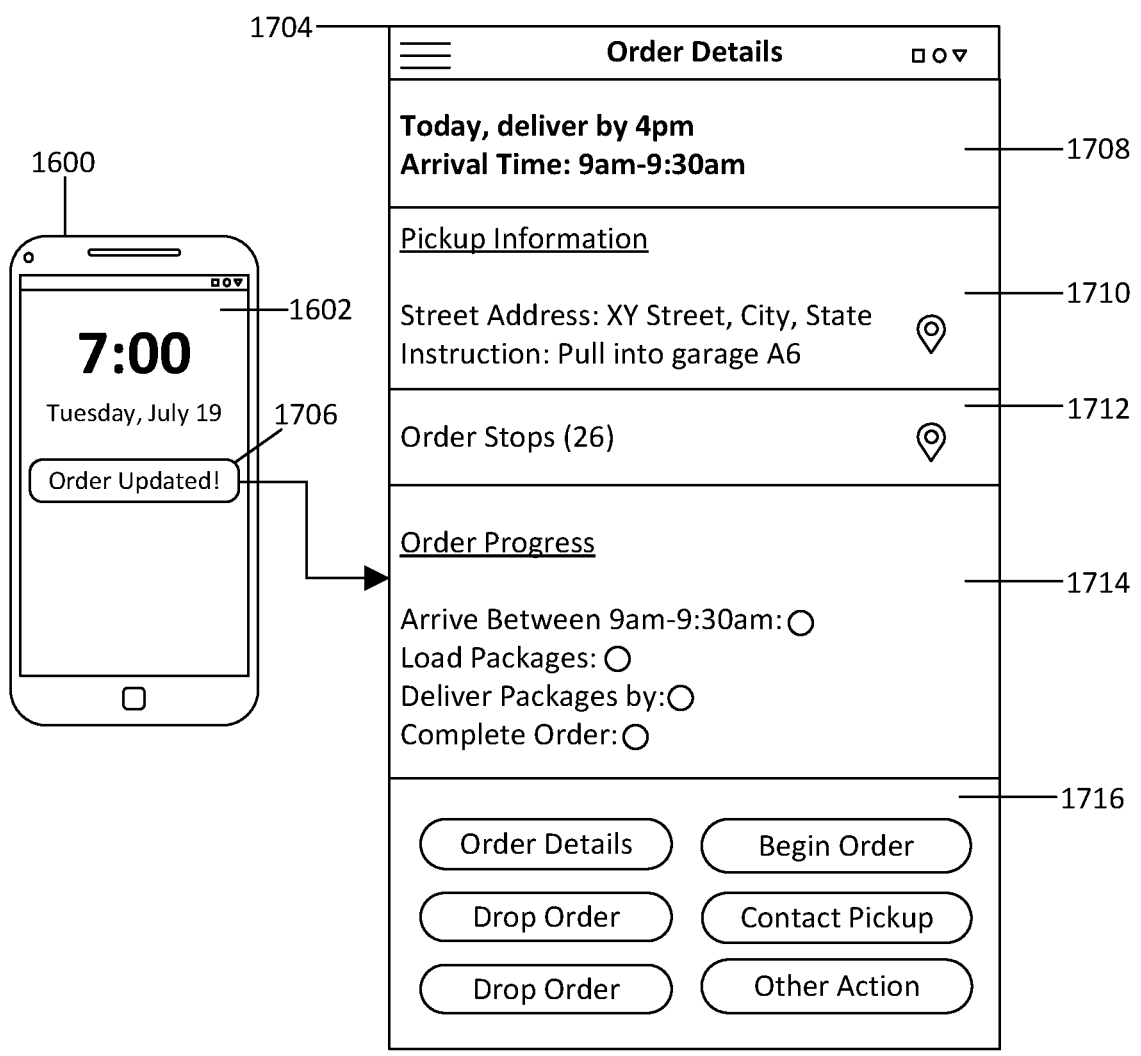
FIG. 17 illustrates example user interfaces for viewing updated orders.

FIG. 17 illustrates example user interfaces for viewing updated orders. The example of FIG. 17 depicts an example of updating order details as part of the work management platform 202 actualizing orders and transmitting order details to a worker, processes described above in connection with FIGS. 11-12 and 15. FIG. 17 includes the mobile device 1600. In some examples, the mobile device 1600 may be the same mobile device described in connection with FIG. 16. The mobile device 1600 may display the home user interface 1602 and the order details user interface 1704. The home user interface 1602 may be the same user interface as the user interface described in connection with FIG. 16. In the example of FIG. 17, the home user interface 1602 includes an order updated notification 1706. The order updated notification 1706 may be a push notification associated with the mobile application that is associated with the work management platform 202. In some embodiments, the work management platform 202 may push the order updated notification 1706 to the mobile device 1600 as part of actualizing future orders or as part of transmitting order details to workers. In some embodiments, the order updated notification 1706 may indicate that multiple orders have been updated. In some examples, a user may select the order available notification 1706, thereby activating the mobile application and displaying the order details user interface 1704.

The order details user interface 1704 includes details of one or more updated orders. As described above, an updated order may correspond to a future order that a worker previously claimed, but may have more details about the order and may be closer to being ready for fulfillment. The order details user interface 1704 may include one or more times 1708 associated with the order. The order details may include pickup information 1710, which may include an address of a pickup location (e.g., a store or sortation center). The order details may include route information 1712 (e.g., a list of stops or destinations, a map, or other information related to completing an order). The order details may include order progress 1714, which may show a list of phases involved with completing the order. In some embodiments, the work management platform 202 may receive information (e.g., from the mobile application) indicating that a worker has completed one or more phases, and the work management platform 202 may update order-worker data accordingly. The order details may include one or more actions 1716 that may be selected by a user (e.g., by clicking, pressing a touch screen, or voice command). In the example shown, the actions include viewing order details, beginning an order, dropping an order, contacting an organization associated with the pickup location, dropping an order, or performing a different action.

Figure 18:
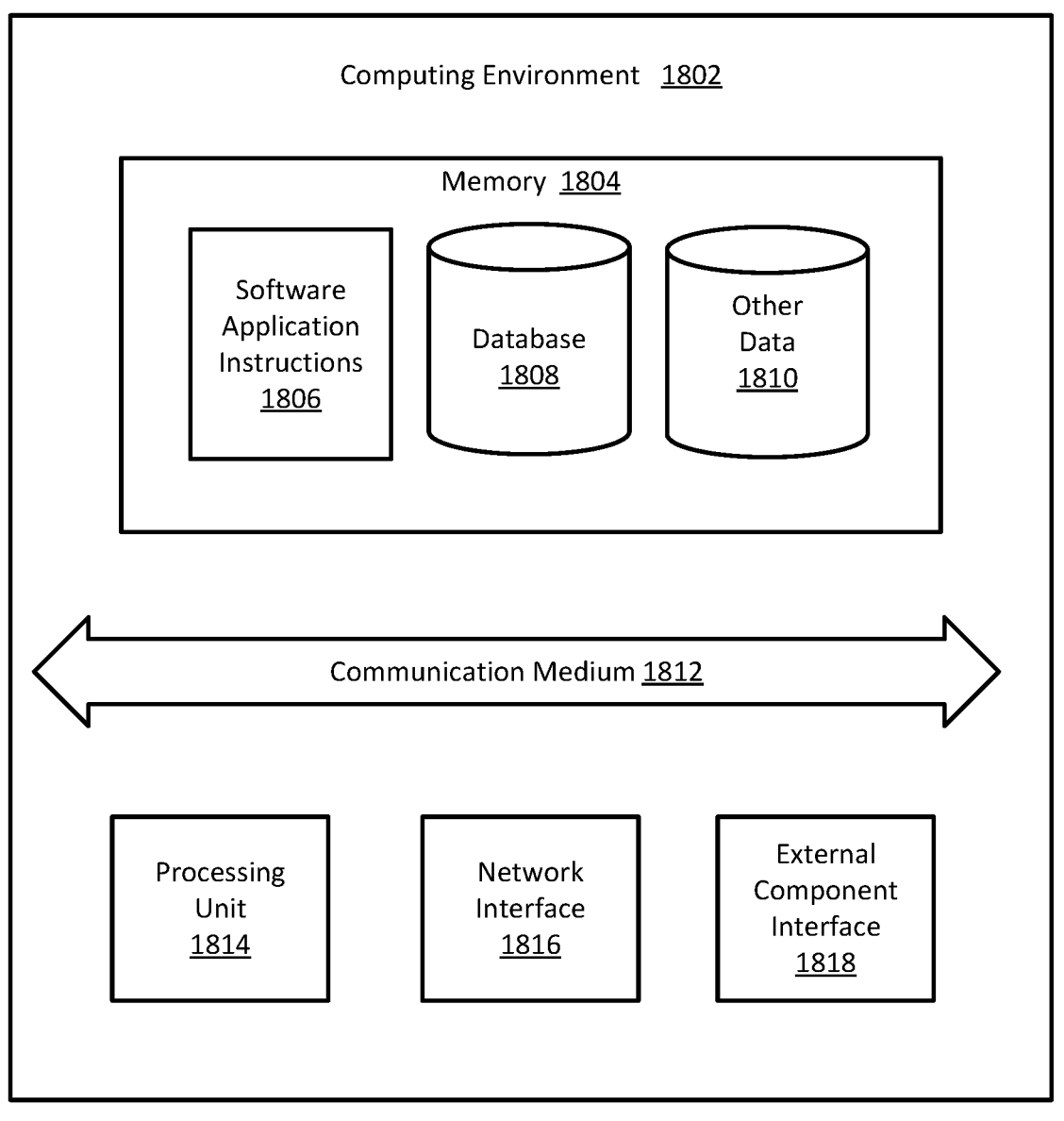
FIG. 18 illustrates an example block diagram of a computing system.

FIG. 18 illustrates an example system 1800 with which disclosed systems and methods can be used. In an example, the following can be implemented in one or more systems 1800 or in one or more systems having one or more components of system 1800: the work management platform 202, the mobile devices 204a-x, the user 206, the order creation system 208, the location system 210, the worker registration system 212, the external database 214, one or more components of the work management platform 202, one or more of the models 802, 814, 1402, and 1416, the mobile device 1600, and other aspects of the present disclosure.

In an example, the system 1800 can include a computing environment 1802. The computing environment 1802 can be a physical computing environment, a virtualized computing environment, or a combination thereof. The computing environment 1802 can include memory 1804, a communication medium 1812, one or more processing units 1814, a network interface 1816, and an external component interface 1818.

The memory 1804 can include a computer readable storage medium. The computer storage medium can be a device or article of manufacture that stores data and/or computer-executable instructions. The memory 1804 can include volatile and nonvolatile, transitory and non-transitory, removable and non-removable devices or articles of manufacture implemented in any method or technology for storage of information, such as computer readable instructions, data structures, program modules, or other data. By way of example, and not limitation, computer storage media may include dynamic random access memory (DRAM), double data rate synchronous dynamic random access memory (DDR SDRAM), reduced latency DRAM, DDR2 SDRAM, DDR3 SDRAM, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data.

The memory 1804 can store various types of data and software. For example, as illustrated, the memory 1804 includes software application instructions 1806, one or more databases 1808, as well as other data 1810. The communication medium 1812 can facilitate communication among the components of the computing environment 1802. In an example, the communication medium 1812 can facilitate communication among the memory 1804, the one or more processing units 1814, the network interface 1816, and the external component interface 1818. The communications medium 1812 can be implemented in a variety of ways, including but not limited to a PCI bus, a PCI express bus accelerated graphics port (AGP) bus, a serial Advanced Technology Attachment (ATA) interconnect, a parallel ATA interconnect, a Fiber Channel interconnect, a USB bus, a Small Computing system interface (SCSI) interface, or another type of communications medium.

The one or more processing units 1814 can include physical or virtual units that selectively execute software instructions, such as the software application instructions 1806. In an example, the one or more processing units 1814 can be physical products comprising one or more integrated circuits. The one or more processing units 1814 can be implemented as one or more processing cores. In another example, one or more processing units 1814 are implemented as one or more separate microprocessors. In yet another example embodiment, the one or more processing units 1814 can include an application-specific integrated circuit (ASIC) that provides specific functionality. In yet another example, the one or more processing units 1814 provide specific functionality by using an ASIC and by executing computer-executable instructions.

The network interface 1816 enables the computing environment 1802 to send and receive data from a communication network. The network interface 1816 can be implemented as an Ethernet interface, a token-ring network interface, a fiber optic network interface, a wireless network interface (e.g., Wi-Fi), or another type of network interface.

The external component interface 1818 enables the computing environment 1802 to communicate with external devices. For example, the external component interface 1818 can be a USB interface, Thunderbolt interface, a Lightning interface, a serial port interface, a parallel port interface, a PS/2 interface, or another type of interface that enables the computing environment 1802 to communicate with external devices. In various embodiments, the external component interface 1818 enables the computing environment 1802 to communicate with various external components, such as external storage devices, input devices, speakers, modems, media player docks, other computing devices, scanners, digital cameras, and fingerprint readers.

Although illustrated as being components of a single computing environment 1802, the components of the computing environment 1802 can be spread across multiple computing environments 1802. For example, one or more of instructions or data stored on the memory 1804 may be stored partially or entirely in a separate computing environment 1802 that is accessed over a network.

Depending on the size and scale of the computing environment 1802, it may be advantageous to include one or more load balancers to balance traffic across multiple physical or virtual machine nodes.

Aspects of the system 1800 and the computing environment 1802 can be protected using a robust security model.

In an example, users may be made to sign into the system using a directory service. Connection and credential information can be externalized from jobs using an application programming interface. Credentials can be stored in an encrypted repository in a secured operational data store database space. Privileges can be assigned based on a collaboration team and mapped to a Lightweight Directory Access Protocol (LDAP) Group membership. A self-service security model can be used to allow owners to assign others permissions on their objects (e.g., actions).

Each node may be configured to be capable of running the full system 1800, such that portal can run and schedule jobs and serve the portal user interface as long as a single node remains functional. The environment 1802 may include monitoring technology to determine when a node is not functioning so an appropriate action can be taken.

While particular uses of the technology have been illustrated and discussed above, the disclosed technology can be used with a variety of data structures and processes in accordance with many examples of the technology. The above discussion is not meant to suggest that the disclosed technology is only suitable for implementation with the data structures shown and described above.

This disclosure described some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art.

As should be appreciated, the various aspects (e.g., operations, memory arrangements, etc.) described with respect to the figures herein are not intended to limit the technology to the particular aspects described. Accordingly, additional configurations can be used to practice the technology herein and/or some aspects described can be excluded without departing from the methods and systems disclosed herein.

Similarly, where operations of a process are disclosed, those operations are described for purposes of illustrating the present technology and are not intended to limit the disclosure to a particular sequence of operations. For example, the operations can be performed in differing order, two or more operations can be performed concurrently, additional operations can be performed, and disclosed operations can be excluded without departing from the present disclosure. Further, each operation can be accomplished via one or more sub-operations. The disclosed processes can be repeated.

Although specific aspects were described herein, the scope of the technology is not limited to those specific aspects. One skilled in the art will recognize other aspects or improvements that are within the scope of the present technology. Therefore, the specific structure, acts, or media are disclosed only as illustrative aspects. The scope of the technology is defined by the following claims and any equivalents therein.

The invention claimed is:

1. A platform comprising:

a first machine learning model configured to predict a number of completed orders for workers;

a second machine learning model configured to generate order-worker completion likelihoods for orders and workers;

a processor; and a memory storing instructions, wherein the instructions, when executed by the processor, cause the platform to:

at a first time:

receive a plurality of future orders associated with a plurality of workers, wherein each future order of the plurality of future orders is claimed by a worker of the plurality of workers, wherein the plurality of future orders include incomplete data, and wherein a first worker of the plurality of workers claims a first number of future orders including a first future order of the plurality of future orders by selecting, in a user interface displayed by a first mobile device of the first worker, a button to claim the first future order, wherein the user interface displays incomplete data of the first future order;

in real time, at a second time later than the first time:

receive a plurality of orders, wherein the plurality of orders include complete data;

generate, using the first machine learning model, a predicted number of completed orders for each worker of the plurality of workers, wherein generating, using the first machine learning model, the predicted number of completed orders comprises predicting that the first worker will complete a second number of orders, wherein the second number of orders predicted by the first machine learning model is less than the first number of future orders claimed by the first worker;

generate a plurality of order-worker completion likelihoods by generating, using a second machine learning model and the plurality of orders received in real time, an order-worker completion likelihood for each worker of the plurality of workers and each order of the plurality of orders, wherein the second machine learning model includes a worker location input feature and wherein generating the order-worker completion likelihood for each worker of the plurality of workers and each order of the plurality of orders comprises obtaining, by a GPS device in a mobile device of the worker, a geolocation of the worker and inputting the geolocation as a value for the worker location input feature into the second machine learning model, such that the order-worker completion likelihoods associated with the worker depend at least in part on the geolocation of the worker;

using the plurality of order-worker completion likelihoods, match each worker of the plurality of workers with a number of orders up to the predicted number of completed orders, wherein the first worker is matched with a number of orders less than or equal to the second number of orders predicted by the first machine learning model;

for the first worker, automatically push, in real time, a notification to the first mobile device, wherein the push notification, when selected on a home screen of the first mobile device, causes the first mobile device to display, in the user interface, complete data for an actualized order corresponding to the first future order;

at a third time later than the second time:

receive, from the first mobile device, data indicating that the first worker dropped the actualized order;

responsive to receiving the data indicating that the first worker dropped the actualized order, using geolocation data obtained from GPS devices of the plurality of worker devices, automatically select a second worker of the plurality of workers based on a proximity of a second mobile device to a location of the actualized order and transmit a second push notification to the second mobile device of the second worker, wherein the second push notification notifies the second worker that the actualized order is reassigned to the second worker;

generate a training instance comprising feature values and a label, wherein the feature values include (i) a weather condition, (ii) a time, (iii) order characteristics of the actualized order, and (iv) a worker characteristic of the first worker, and wherein the label indicates that the first worker dropped the actualized order;

continuously update each of the first machine learning model and the second machine learning model, wherein continuously updating the first machine learning model and the second machine learning model comprises training each of the first machine learning model and the second machine learning model using the generated training instance, wherein training the first machine learning model comprises altering, based on a difference between the label of the generated training instance and a prediction by the first machine learning model based on the feature values of the generated training instance, parameters of the first machine learning model such that subsequent predicted numbers of orders completed by the first worker are fewer.

2. The work management platform of claim 1, wherein each future order of the plurality of future orders is a placeholder for an order of the plurality of orders; and wherein each future order of the plurality of future orders comprises an estimated time and an estimated duration.

3. The work management platform of claim 1, wherein each order of the plurality of orders is a delivery; and wherein each worker of the plurality of workers is a driver.

4. The work management platform of claim 1, wherein each order of the plurality of orders comprises an origin location and one or more destinations;

wherein the origin location is a sortation center, a warehouse, or a store; and wherein the one or more destinations include one or more residences.

5. The deliver management platform of claim 1, wherein receiving the plurality of future orders is performed at least four hours before actualizing the plurality of future orders.

6. The work management platform of claim 1, wherein the instructions, when executed by the processor, further cause the work management platform to:

determine order-worker preferences scores using location match scores and duration match scores; and matching at least some of the plurality of workers with at least some of the plurality of orders using the order-worker preference scores.

7. The work management platform of claim 1, wherein using the plurality of order-worker completion likelihoods to match the worker to the number of orders up to the predicted number of completed orders is performed by optimizing a metric subject to one or more constraints; and wherein the metric includes one or more of the plurality of order-worker completion likelihoods.

8. The work management platform of claim 1, wherein one or more first model inputs include one or more of a number of future orders claimed, an external condition, or a past worker behavior; and wherein one or more second model inputs include one or more of a worker drop ratio, an order time, an order location, or an order duration.

9. The work management platform of claim 1, wherein the first model is trained at least in part on past future order data, past external condition data, and past worker behavior data; and wherein the second model is trained at least in part on past order data and second past worker behavior data.

10. The work management platform of claim 9, wherein the first model or the second model uses gradient boosting.

11. The work management platform of claim 1, wherein the instructions, when executed by the processor, further cause the work management platform to:

prior to receiving the plurality of future orders associated with the plurality of workers, offer the plurality of future orders to the plurality of workers; and transmit order details to the plurality of workers.

12. The work management platform of claim 1, wherein the instructions, when executed by the processor, further cause the delivery management platform to:

receive one or more communications from one or more of the plurality of workers, each of the one or more communications indicating that an order of the plurality of orders is dropped or completed;

generating, based at least in part on the one or more communications, one or more training instances; and altering, using the one or more training instances, one or more parameters of one or more of the one or more models.

13. A method, the method comprising:

at a first time:

receiving a plurality of future orders associated with a plurality of workers, wherein each future order of the plurality of future orders is claimed by a worker of the plurality of workers, wherein the plurality of future orders include incomplete data, and wherein a first worker of the plurality of workers claims a first number of future orders including a first future order of the plurality of future orders by selecting, in a user interface displayed by a first mobile device of the first worker, the first future order, wherein the user interface displays incomplete data of the first future order;

at a second time later than the first time:

receiving a plurality of orders, wherein the plurality of orders include complete data;

generating, using a first machine learning model configured to predict a number of completed orders for workers, a predicted number of completed orders for each worker of the plurality of workers, wherein generating, using the first machine learning model, the predicted number of completed orders comprises predicting that the first worker will complete a second number of orders, wherein the second number of orders predicted by the first machine learning model is less than the first number of future orders claimed by the first worker;

generating a plurality of order-worker completion likelihoods by generating, using a second machine learning model and the plurality of orders, an order-worker completion likelihood for each worker of the plurality of workers and each order of the plurality of orders, wherein generating the order-worker completion likelihood for each worker of the plurality of workers and each order of the plurality of orders comprises obtaining, by a GPS device in a mobile device of the worker, a geolocation of the worker and inputting the geolocation into the second machine learning model, such that the order-worker completion likelihoods associated with the worker depend at least in part on the geolocation of the worker;

using the plurality of order-worker completion likelihoods, match each worker of the plurality of workers with a number of orders up to the predicted number of completed orders, wherein the first worker is matched with a number of orders less than or equal to the second number of orders predicted by the first machine learning model;

for the first worker, automatically pushing a notification to the first mobile device, wherein the push notification, when selected on a home screen of the first mobile device, causes the first mobile device to display, in the user interface, complete data for an actualized order corresponding to the first future order;

at a third time later than the second time:

receiving, from the first mobile device, data indicating that the first worker dropped the actualized order;

responsive to receiving the data indicating that the first worker dropped the actualized order, using geolocation data obtained from GPS devices of the plurality of worker devices, automatically selecting a second worker of the plurality of workers based on a proximity of a second mobile device to a location of the actualized order and transmitting a second push notification to the second mobile device of the second worker, wherein the second push notification notifies the second worker that the actualized order is reassigned to the second worker;

generating a training instance comprising feature values and a label, wherein the feature values include (i) a weather condition, (ii) order characteristics of the actualized order, and (iii) a worker characteristic of the first worker, and wherein the label indicates that the first worker dropped the actualized order;

continuously updating the first machine learning model, wherein continuously updating the first machine learning model comprises training the first machine learning model using the generated training instance, wherein training the first machine learning model comprises altering, based on a difference between the label of the generated training instance and a prediction by the first machine learning model based on the feature values of the generated training instance, parameters of the first machine learning model such that subsequent predicted numbers of orders completed by the first worker are fewer.

14. The method of claim 13, wherein each order of the plurality of orders is a delivery comprising an origin location and one or more destinations;

wherein each worker of the plurality of workers is a driver;

wherein the origin location is a sortation center, a warehouse, or a store;

wherein the one or more destinations include one or more residences; and wherein receiving the plurality of future orders is performed at least four hours before receiving the plurality of orders.

15. The method of claim 13, wherein model inputs of the first model include one or more of a number of future orders claimed, an external condition, or a past worker behavior; and wherein model inputs of the second model include one or more of a worker drop ratio, an order time, an order location, or an order duration.

16. The method of claim 13, further comprising:

prior to receiving the plurality of future orders associated with the plurality of workers, offering the plurality of future orders to the plurality of workers; and transmitting order details to the plurality of workers.

17. A non-transitory computer-readable medium, having stored instructions thereon, which when executed by the processor, cause the processor to manage work by performing a method comprising:

at a first time:

receiving a plurality of future deliveries associated with a plurality of drivers, wherein the plurality of future deliveries include incomplete data, and wherein a first driver of the plurality of drivers claims a first number of future orders including a first future delivery of the plurality of future deliveries by selecting, in a user interface displayed by a first mobile device of the first driver, the first future delivery, wherein the user interface displays incomplete data of the first future delivery;

at a second time later than the first time:

receiving a plurality of deliveries;

generating, using a first machine learning model configured to predict a number of completed orders for workers, a predicted number of completed deliveries for each driver of the plurality of drivers, wherein generating, using the first machine learning model, the predicted number of completed orders comprises predicting that the first worker will complete a second number of orders, wherein the second number of orders predicted by the first machine learning model is less than the first number of future orders claimed by the first worker;

generating a plurality of delivery-driver completion likelihoods by generating, using a second machine learning model and the plurality of deliveries, a delivery-driver completion likelihood for each driver of the plurality of drivers and each delivery of the plurality of deliveries, wherein generating the delivery-driver completion likelihood for each driver of the plurality of drivers and each delivery of the plurality of deliveries comprises obtaining, by a GPS device in a mobile device of the worker, a geolocation of the worker and inputting the geolocation into the second machine learning model, such that the delivery-driver completion likelihoods associated with the driver depend at least in part on the geolocation of the driver;

using the plurality of delivery-driver completion likelihoods, match each driver of the plurality of drivers with a number of deliveries, wherein the first worker is matched with a number of orders less than or equal to the second number of orders predicted by the first machine learning model; for the first driver, automatically pushing a notification to the first mobile device, wherein the push notification, when selected on a home screen of the first mobile device, causes the first mobile device to display, in the user interface, complete data for an actualized delivery corresponding to the first future delivery;

at a third time later than the second time:

receiving, from the first mobile device, data indicating that the first worker dropped the actualized order;

responsive to receiving the data indicating that the first worker dropped the actualized order, using geolocation data obtained from GPS devices of the plurality of worker devices, automatically selecting a second worker of the plurality of workers based on a proximity of a second mobile device to a location of the actualized order and transmitting a second push notification to the second mobile device of the second worker, wherein the second push notification notifies the second worker that the actualized order is reassigned to the second worker;

generating a training instance comprising feature values and a label, wherein the feature values include (i) a time, (ii) order characteristics of the actualized order, and (iii) a worker characteristic of the first worker, and wherein the label indicates that the first worker dropped the actualized order;

continuously updating the first machine learning model, wherein continuously updating the first machine learning model comprises training the first machine learning model using the generated training instance, wherein training the first machine learning model comprises altering, based on a difference between the label of the generated training instance and a prediction by the first machine learning model based on the feature values of the generated training instance, parameters of the first machine learning model such that subsequent predicted numbers of orders completed by the first worker are fewer.

\* \* \* \* \*